United States Patent
Hao et al.

(10) Patent No.: US 11,138,216 B2
(45) Date of Patent: Oct. 5, 2021

(54) AUTOMATICALLY INVOKED UNIFIED VISUALIZATION INTERFACE

(71) Applicant: HEWLETT-PACKARD DEVELOPMENT COMPANY, L.P., Houston, TX (US)

(72) Inventors: Ming C Hao, Palo Alto, CA (US); Michael Hund, Constance (DE); Nelson L Chang, Palo Alto, CA (US); Riddhiman Ghosh, Cupertino, CA (US); Gregory William Cook, Palo Alto, CA (US); Kevin Smathers, Palo Alto, CA (US); Arun Kumar Paruchuri, Palo Alto, CA (US); Renato Keshet, Haifa (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 240 days.

(21) Appl. No.: 15/539,850

(22) PCT Filed: Feb. 20, 2015

(86) PCT No.: PCT/US2015/016813
§ 371 (c)(1),
(2) Date: Jun. 26, 2017

(87) PCT Pub. No.: WO2016/133534
PCT Pub. Date: Aug. 25, 2016

(65) Prior Publication Data
US 2018/0004820 A1 Jan. 4, 2018

(51) Int. Cl.
*H04L 12/18* (2006.01)
*G06F 16/248* (2019.01)

(52) U.S. Cl.
CPC ............ *G06F 16/248* (2019.01); *H04L 12/18* (2013.01)

(58) Field of Classification Search
CPC ......... G06F 16/248; G06F 9/542; H04L 12/18
See application file for complete search history.

(56) References Cited

U.S. PATENT DOCUMENTS

| 6,263,334 B1 | 7/2001 | Fayyad et al. |
| 6,314,453 B1 | 11/2001 | Hao et al. |
| | (Continued) | |

OTHER PUBLICATIONS

"Stroscope: Multi-scale Visualization of Irregularly Measured Time-series Date"; Date: Feb. 26, 2014.
(Continued)

*Primary Examiner* — Hosain T Alam
*Assistant Examiner* — Anthony G Gemignani
(74) *Attorney, Agent, or Firm* — HP Inc. Patent Department

(57) ABSTRACT

A unified visualization interface is disclosed. One example is a system including an association module, a multicasting module, a data sharing module, and a unified visualization interface. The association module associates an identified event in a first visualization system with a visualization function. The multicasting module stores event data related to the identified event and the associated visualization function in a shared data source, and multicasts the identified event to a second visualization system. The data sharing module associates the event data with characteristics of the first visualization system, and shares, in response to the multicast of the identified event, the shared data source with the second visualization system. The unified visualization interface automatically invokes, without software changes, the second visualization system in response to the multicast of the identified event, the invoking based on the shared data source including the characteristics of the first visualization system.

14 Claims, 14 Drawing Sheets

(56) References Cited

U.S. PATENT DOCUMENTS

| | | |
|---|---|---|
| 6,330,685 B1 | 12/2001 | Hao et al. |
| 6,824,174 B2 | 11/2004 | Lin |
| 6,906,709 B1 | 6/2005 | Larkin et al. |
| 6,917,518 B2 | 7/2005 | Chen |
| 6,918,274 B2 | 7/2005 | Gladden |
| 6,957,979 B2 | 10/2005 | Welsh |
| 7,201,407 B2 | 4/2007 | Schlack |
| 7,325,846 B2 | 2/2008 | Smith |
| 7,343,362 B1 | 3/2008 | Flippen |
| 7,593,013 B2 | 9/2009 | Agutter et al. |
| 8,006,224 B2 | 8/2011 | Bateman et al. |
| 8,392,418 B2 | 3/2013 | Birdwell et al. |
| 8,626,894 B2 | 1/2014 | Chen |
| 2004/0088577 A1 | 5/2004 | Render |
| 2005/0004823 A1 | 1/2005 | Hnatio |
| 2005/0065951 A1 | 3/2005 | Liston et al. |
| 2005/0074529 A1* | 4/2005 | Cohen .............. H04L 41/22 426/106 |
| 2005/0128201 A1* | 6/2005 | Warner .............. G06T 13/20 345/474 |
| 2005/0160396 A1 | 7/2005 | Chadzynski |
| 2006/0221077 A1* | 10/2006 | Wright .............. G06T 3/4023 345/428 |
| 2007/0242066 A1* | 10/2007 | Rosenthal .......... H04N 5/272 345/419 |
| 2007/0245353 A1 | 10/2007 | Ben-Dor |
| 2008/0243786 A1* | 10/2008 | Stading .............. G06F 16/93 |
| 2009/0267946 A1 | 10/2009 | Agutter et al. |
| 2010/0325076 A1* | 12/2010 | Paulk ................ G06N 5/02 706/47 |
| 2011/0182349 A1* | 7/2011 | Ananthanarayanan ............. G06T 11/206 375/240.01 |
| 2013/0073719 A1 | 3/2013 | Ando |
| 2013/0127836 A1* | 5/2013 | Joshi ............... G06T 11/203 345/419 |
| 2013/0155078 A1* | 6/2013 | Karimian-Kakolaki .................... G06T 1/20 345/520 |
| 2013/0246969 A1 | 9/2013 | Barton |
| 2013/0339514 A1 | 12/2013 | Crank et al. |
| 2014/0001942 A1 | 1/2014 | Mao |
| 2014/0055400 A1 | 2/2014 | Reuschel |
| 2014/0089287 A1* | 3/2014 | Connolly ........... G06F 16/9038 707/707 |
| 2014/0101591 A1 | 4/2014 | Helfman et al. |
| 2014/0149947 A1 | 5/2014 | Blyumen |
| 2014/0192082 A1 | 7/2014 | Kragness |

OTHER PUBLICATIONS

Goodall, J.R. et al.; "Mathematics and Visualization"; dated: Jan. 2008: http://thongtinkhcn.vinhlong.gov.vn/junkbox/Tin+hoc/Mathematic+and+Visualization.pdf.

Kastner, W. et al.; "Communication Systems for Building automation and Control"; Jun. 2005.

Rodrigues, J.F. et al.; "Visualization Tree, multiple linked analytical decisions" dated; Jun. 10, 2005.

Roe, C.; "Sponsor Spotlight Column: ALTILIA on Big Data"; Apr. 16, 2014.

William Harmon, "Lenovo Thinkserver RD340 Server Review—Specifications, Layout and Installation," Retrieved from Internet Feb. 23, 2015, 11 pps.

"Traceroutes; http://www.eurecom.fr/en/publication/3872/download/rs-publi-3872.pdf".

"Monitoring, and Interpretation of Security Threats"; http://www.research.att.com/export/sites/att_labs/techdocs/TD-6ZWNBM.pdf.

"http://ieeexplore.ieee.org/stamp/stamp.jsp?arnumber=1641014".

"http://igva2012.wikispaces.asu.edu/file/view/VIAssist_Visual_Analytics_Cyber_Defence_Goodall_2019.pdf".

"Transactions for Fraud Detection; http://www.cs.tufts.edu/~remco/publications/2008/IVS-wirevis.pdf".

* cited by examiner

AUTOMATICALLY INVOKED UNIFIED VISUALIZATION INTERFACE

BACKGROUND

Big data applications, such as cohort analysis, recommendation systems, predictive modeling, and pattern recognition, often rely on visualization systems for data analytics. Generally, more than one visualization system may be utilized to analyze different aspects of the data.

DETAILED DESCRIPTION

Figure 1:
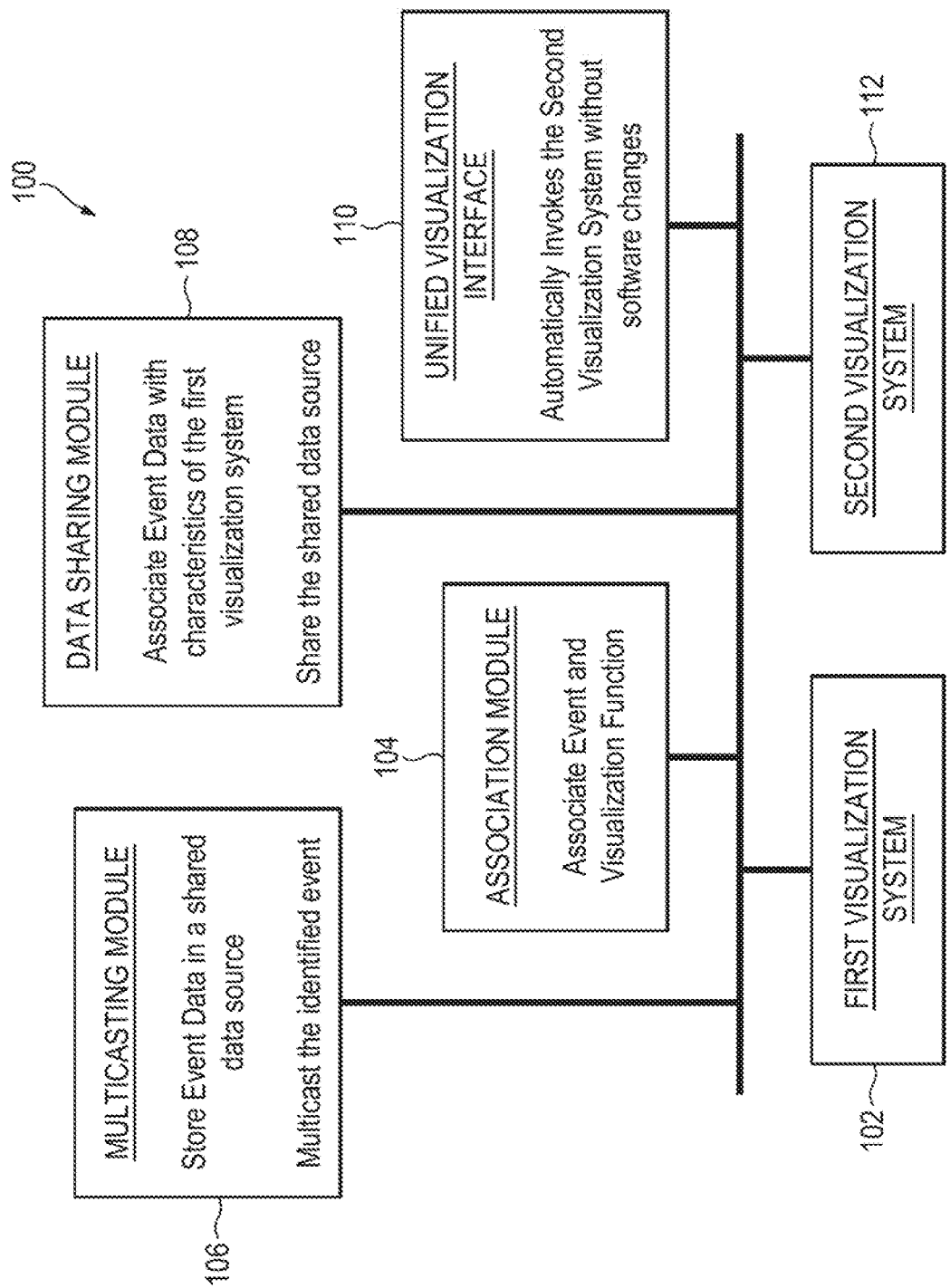
FIG. 1 is a visualization functional block diagram illustrating one example of a system for a unified visualization interface.

An important task for many big data applications, such as sentiment and security data, is visualization of the big data. Generally, one visualization system may not be sufficient, since different visualization systems may provide insights into different aspects of the data.

For example, to detect real-time critical issues from customers, a market analyst may want to know when and where an event took place, and a source for a negative feedback. However, different techniques have different application interfaces, and the market analyst may have to work separately on multiple independent visualization systems to identify different aspects of the event. Likewise, domain experts and system analysts who may want to analyze high dimensional big data, such as web tweets and security logs, may need to work separately on multiple independent visualization systems to discover patterns and outliers from these different visual techniques.

Generally, each visualization system has its own interface, and there is no common application interface for multiple visualization systems. Accordingly, there is a need for a unified visualization interface to simultaneously synchronize and view multiple visualization systems.

Generally, software changes may be required to unify existing techniques. As described herein, a common application interface is disclosed that may support multiple visualization systems without requiring software changes in the component visualization systems. Users may be able to coordinate different visualizations to create unified views, and automatically analyze different views in a consistent and collaborated big display.

The interactive approach described herein is based on a unified visual analytics interface to analyze big data via a simultaneous and synchronized use of multiple visualization systems. As described herein, event multicasting and data source sharing may be used to automatically generate consistent views from different visualization systems to provide a unified picture to analyze issues from multiple aspects, i.e., when, where, who, what, why, and so forth. For example, existing visualization systems may be automatically configured and launched upon event multicasting from a first visualization system.

Examples of the unified visualization interface disclosed herein enable a unified visualization by multicasting external identified events of a user on a selected visualization to other existing visualization systems for peer to peer visual collaboration. Common data sources generated from such external events may be shared among different existing visualization systems without a need for software changes. Markup language may be utilized to provide shared data characteristics, such as scales and color maps, to the different existing visualization systems for consistent views. Automatic launching and floor control of the different existing visualization systems may be performed to synchronize the multiple visualization systems.

As described in various examples herein, a unified visualization interface is disclosed. One example is a system including an association module, a multicasting module, a data sharing module, and a unified visualization interface. The association module associates an identified event in a first visualization system with a visualization function performed by the first visualization system. The multicasting module stores event data related to the identified event and the associated visualization function in a shared data source, and multicasts the identified event to a second visualization system. The data sharing module associates the event data with characteristics of the first visualization system, and shares, in response to the multicast of the identified event, the shared data source with the second visualization system. The unified visualization interface automatically invokes, without software changes, the second visualization system in response to the multicast of the identified event, the invoking based on the shared data source including the characteristics of the first visualization system.

In the following detailed description, reference is made to the accompanying drawings which form a part hereof, and in which is shown by way of Illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a visualization functional block diagram illustrating one example of a system 100 for a unified visualization interface. System 100 is shown to include an association module 104, a multicasting module 106, a data sharing module 108, and a unified visualization interface 110. System 100 is communicatively linked to a first visualization system 102, and a second visualization system 112. The first visualization system 102, association module 104, multicasting module 106, data sharing module 108, unified visualization interface 110, and second visualization system 112, are communicatively linked via a network.

As used herein, the terms visualization system, visualization interface, and visualization display may be used interchangeably. Generally, the visualization system includes hardware and programming to process data, generate a visualization display based on the data, and provide the visualization display via a visualization interface. Generally, a visualization display refers to a visual rendering of data elements generated and/or displayed by a visualization system. In some examples, the visualization display may be provided to a computing device via a visualization interface. In some examples, the visualization interface may be included in the visualization system. In some examples, the visualization interface may be a graphical user interface. In some examples, the visualization interface may be an interactive graphical user interface. In some examples, the visualization system may be the first visualization system 102 and/or the second visualization system 112. In some examples, the visualization interface may be an interactive graphical user interface.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network.

System 100 may include an association module 104 to associate an identified event in a first visualization system 102 with a visualization function performed by the first visualization system. In some examples, the identified event may include one a selection of a portion of a visualization display, and/or a zoom operation on the visualization display. For example, the identified event may be a click, button press, slider movement, hovering over a portion of a visual display, and/or rubber-banding to select a portion of the visual display. As described herein, an event may be identified, for example, when a user selects an event on the first visualization system 102. For example, the first visualization system 102 may display events related to customer issues, and the user may select an event for real-time detection of critical customer issues. The association module 104 identifies the selected event as the identified event. Also, for example, the first visualization system 102 may display high-dimensional data elements related to security ports and IP addresses, and the user may rubber-band and/or zoom-in to a portion of the display to select a subset of data elements to further investigate a data pattern for the selected security ports and IP addresses. The association module 104 identifies the rubber-band and/or zoom-in as the identified event.

Generally, selection of the identified event in the first visualization system 102 prompts the first visualization system 102 to perform a visualization function. A visualization function is any action performed by a visualization system in response to an identified event. In some examples, such action may be a change in a display of events by the visualization system. For example, in a visualization system that displays events via, for example, event bubbles, a visualization function may be a display of links between event bubbles in response to a selection of an event bubble. Also, for example, in a visualization system that displays events geographically via, for example, points on a map, a visualization function may be a display of fewer or additional points on the map in response to a selection of a point on the map. As another example, in a visualization system that displays events via a color map (e.g., associate colors with event attributes such as an IP address), a visualization function may be a modification of the color map based on an identified event.

In some examples, the identified event may be a selection of the portion of the visualization display, and the visualization function may include determining a depth of the portion based on a geometry of the portion. For example, the selection of the portion of the visualization display may be a 3D rubber banding where a virtual rubber band, e.g. a rectangle, may be drawn on the screen and a depth may be determined based on the geometry of the model. The association module 104 may identify the selected data elements, and the data associated with these selected data elements may be analyzed to determine appropriate start and end times for events. Based at least on such considerations, the association module 104 may indicate which collections of data may be included.

The identified event may be associated with the visualization function performed by the association module 104. For example, an event "click" in the first visualization system 102 may be associated with a visualization function "topic link" that displays topics related to the identified event. As another example, an event "zoom-in" in the first visualization system 102 may be associated with a visualization function "display selected data elements" that displays data elements included in the display identified by the "zoom-in". In some examples, the first visualization system 102 may display events as dynamic event bubbles, and a user may click on an event bubble. The association module 104 may identify the clicked event bubble and identify topics related to the event bubble.

Figure 2A:
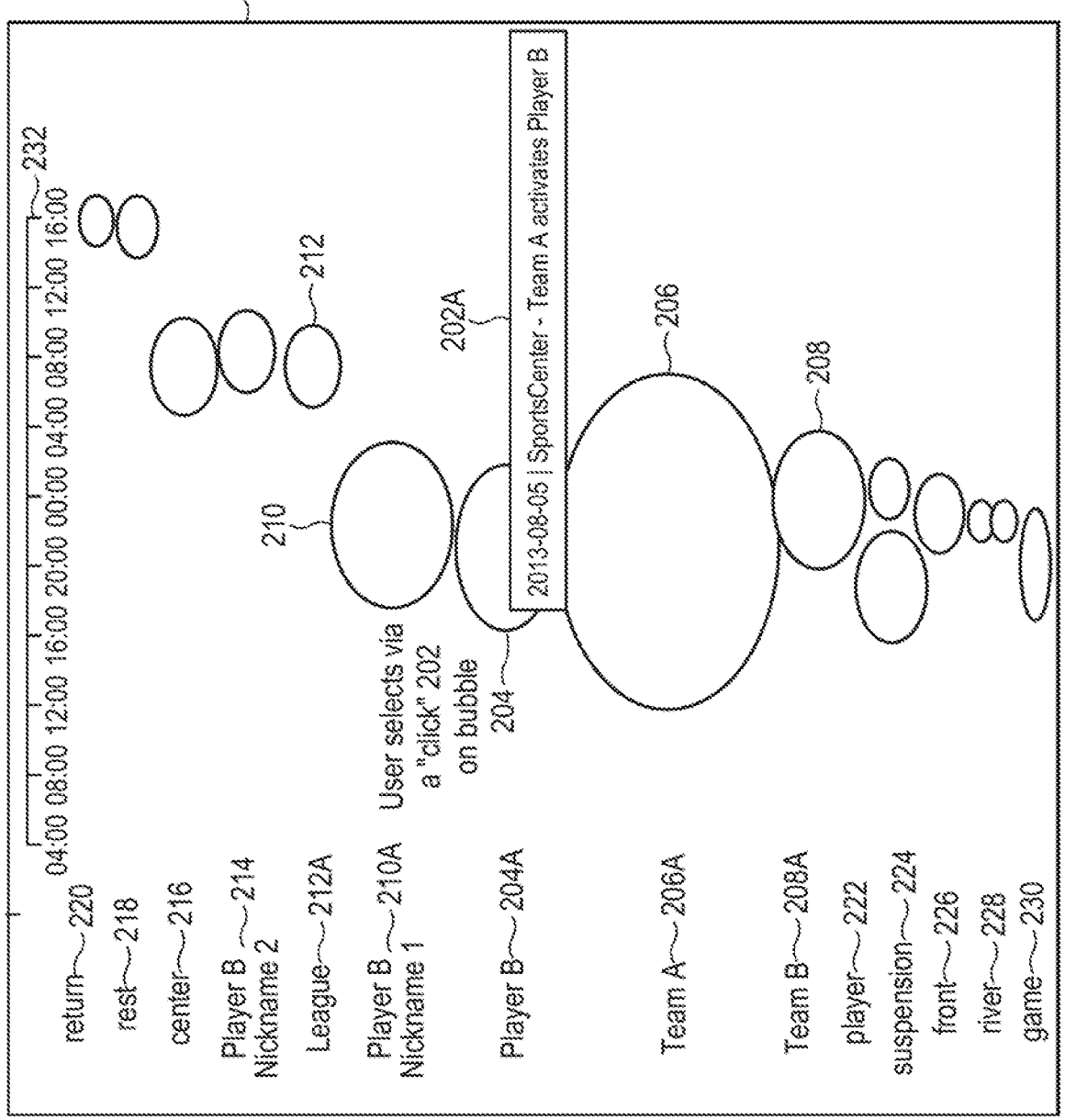
FIG. 2A illustrates an example identified event and associated visualization function for an example first visualization system.

FIG. 2A illustrates an example identified event and associated visualization function for an example first visualization system 200A. The first visualization system 200A may include a real-time display of events and topics during a time interval 232 ranging from, 04:00 to 16:00, in increments of 4 hours. The events may be represented as interactive event bubbles, whereas the topics may be presented as a side-bar. For example, an event represented by event bubble 204 may be associated with a topic "Player B" 204A. When an event is identified, for example, via a click, then the event becomes an identified event. For example, when the association module 104 identifies that the event bubble 204 is selected, for example, when the user selects via a click 202, the event represented by event bubble 204 is then determined to be the identified event. In some examples, a click 202 on the event bubble 204 may display a pop-up 202A including information related to the event, such as, for example, "2013-08-05|SportsCenter—Team A activates Player B", where Player B is the topic "Player B" 204A associated with the event bubble 204.

In some visualization systems, an event bubble may be displayed with an associated topic. For example, the associated topic may be displayed alongside an event bubble, and may be dynamically located based on a movement of the event bubble. For example, when the event bubble moves up in a visualization display, the topic may also move up. In some examples, when an event bubble is no longer displayed on a visualization display, the associated topic is also removed from the visualization display.

Examples of event bubbles and associated topics are illustrated. For example, event bubble 206 may be associated with topic "Team A" 206A; event bubble 208 may be associated with topic "Team B" 208A; event bubble 210 may be associated with topic "Player B Nickname 1" 210A; event bubble 212 may be associated with topic "League" 212A. Topics may also include, for example, "Player B Nickname 2" 214, "center" 216, "rest" 218, "return" 220, "player" 222, "suspension" 224, "front" 226, "river" 228, and "game" 230. Each such topic may be associated with a corresponding event bubble.

Referring again to FIG. 1, system 100 may include a multicasting module 106 to store event data related to the event and the associated visualization function in a shared data source, and multicast the identified event to a second visualization system 112. Generally, the term "multicast", as used herein, refers to an indication to existing visualization systems (e.g., the second visualization system 112) that an event has been identified in the first visualization system 102. In some examples, multicast may refer to an indication that a visualization function has been associated with the identified event. As used herein, a "shared data source" is a database that is shared by the first visualization system 102 and the second visualization system 112, and/or other components of system 100. Event data may include, for example, events and associated topics, a selected subset of a high-dimensional dataset, selected dimensions for data elements in a high-dimensional dataset, cohort selection in a top-k similarity search, and so forth. Event data may also include, for example, data related to characteristics of the first visualization system 102 and the second visualization system 112, such as color, scaling, font, and so forth.

In some examples, the multicasting module 106 may generate the shared data source based on data received from the association module 104. In some examples, the multicasting module 106 may associate a timestamp with the event data. For example, as described herein, the multicasting module 106 may receive a first event data related to a first identified event from the first visualization system 102 and may receive a second event data related to a second identified event (identified in response to the first identified event) from the second visualization system 112. The multicasting module 106 may maintain respective timestamps for the first identified event and the second identified event, and may additionally store information indicative of the second identified event being identified in response to the first identified event. Generally, a shared data source generated from identified events among different existing visualization systems eliminates a need for software changes in the existing visualization systems.

System 100 may include a data sharing module 108 to associate the event data with characteristics of the first visualization system 102, and share, in response to the multicast of the identified event, the shared data source with the second visualization system 112. In some examples, associating the event data with the characteristics of the first visualization system 102 includes associating an extensible markup language ('XML') configuration with the event data. A markup language, as used herein, is an annotation of the event data. Such an annotation may be performed via digital tags. The markup language configuration may include instructions to perform actions based on the annotation. For example, the markup language configuration may include instructions related to characteristics of the first visualization system 102, such as scale and color map. Also, for example, the markup language configuration may include instructions related to event data, such as input parameters, and special data handling instructions. As used herein, an XML is an encoding of the event data, where the encoding may be both human-readable and machine-readable.

In some examples, the data sharing module 108 accesses the event data in the shared data source, generates the markup language configuration, and associates the event data with the markup language configuration. In some examples, data sharing module 108 may share the event data and the markup language configuration with the second visualization system 112. For example, the data sharing module 108 may provide XML to provide common characteristics of the first visualization system 102 and the second visualization system 112, such as scales and color maps, to all visualization systems for consistent visual displays.

With continued reference to FIG. 1, system 100 may include a unified visualization interface 110 to automatically invoke, without software changes, the second visualization system 112 in response to the multicast of the identified event, the invoking based on the shared data source including the characteristics of the first visualization system 102. Generally, the unified visualization interface 110 overcomes problems associated with each visualization system having a respective interface, and overcomes a need for software changes in the visualization systems to make them compatible with the first visualization system 102. Generally, in existing techniques, each visualization system may need to be invoked or launched via separate "starting procedures". The unified visualization interface 110 unifies the starting procedures in a common interface. In some examples, this may be achieved by re-initiating the second visualization system 112 with the shared data source, and by retaining the characteristics of the first visualization system 102, unless a user changes a configuration in real-time.

Events captured from the first visualization system 102 may represent subsets of data, and/or characteristics of the first visualization system 102, such as color scale, zoom-level, and so forth. After the multicasting module 106 multicasts the identified event, application program interfaces ("APIs") provided by different visualizations may be utilized to automatically invoke the second visualization system 112 in response to the multicast of the identified event. An API is a set of routines, protocols, and/or tools for building software applications, by specifying how different visualization systems may interact.

In some examples, the event data may be "passed-by-value," but may be sent referentially, since different visualization systems may be sharing the same shared data source. In some examples, such interfaces may not be explicitly provided. In such instances, operating system ("OS")-level scripting may be utilized to invoke the second visualization system 112.

For example, the second visualization system 112 may be presented as a Web Application, and the starting procedure for the second visualization system 112 may involve navigation to a specified uniform resource locator ("URL"), invocation of application program interface requests, generation of virtual mouse and keyboard events, and/or direct manipulation of session variables. In some examples, the API request may include a representative state transfer ("REST") API request.

In some examples, the second visualization system 112 may be based on a pixel-based helix visualization of a time series, and the multicasting module 106 may determine coordinates for limits as indicated by a starting point and a stopping point, and the unified visualization interface 110 may automatically invoke the second visualization system 112 by placing a virtual camera at a position and orientation, based on the coordinates and the event data, to make an indicated sequence of the time series visible by the virtual camera.

In some examples, a preceding visualization process of the second visualization system 112 may be implemented in a programming language (e.g., Java), and the unified visualization interface 110 may automatically invoke the second visualization system 112 by inactivating the preceding visualization process (e.g., a Java Virtual Machine process), and by further performing one of requesting an operating system to launch a new process, generating a virtual mouse event, generating a virtual keyboard event, and via an application automation protocol built into the second visualization system 112. For example, an XML configuration may be received by the unified visualization interface 110, and the second visualization system 112 may be configured based on the configurations specified in the XML configuration.

For example, when the event data is based on a time series, and the selected time series is limited by the associated visualization function, then the data sharing module 108 may generate an XML configuration that identifies a starting point and a stopping point as limits of the time series data. The unified visualization interface 110 may receive the starting point and the stopping point, convert the time series data limited by the starting point and the stopping point into a collection of three-dimensional coordinates (x, y, z), and configure a virtual camera in the second visualization system 112 to be placed at the position and orientation specified by the collection of three-dimensional coordinates (x, y, z). In some examples, the unified visualization interface 110 may configure the virtual camera to make the selected time series visible in a three-dimensional rendering by the second visualization system 112.

In some examples, some data points in the event data may be associated with color changes, transparency, and so forth. For example, the markup language configuration of the event data may specify that the associated visualization function is to blur some pixel colors of the event data. Accordingly, the unified visualization interface 110 may configure the virtual camera based on the markup language configuration to adjust the pixel colors of the event data.

Also, for example, the markup language configuration of the event data may indicate that objects rendered in the first visualization system 102 may be scaled for increased fidelity of relative sizes of objects. Accordingly, the unified visualization interface 110 may configure the second visualization system 112 based on the specified scaling.

As described herein, the first visualization system 102 may be a system that generates a pixel-based helix visualization. For example, the visualization may be a helix-shaped structure, where each pixel represents a data element, and pixel attributes (e.g., color) represent data attributes (e.g., IP address, port number) of the data element. A portion of the visualization display in the first visualization system 102 may be selected, such as, a 3D rubber banding where a virtual rubber band, e.g. a rectangle, may be drawn on the screen. The association model 104 may identify the selection as the identified event and an associated function may be determining depth based on a geometry of the model. The association model 104 may identify the selected data elements as the identified function, and an associated function may be determining appropriate start and end times for events. The data sharing module 108 may generate XML configuration indicative of such start and end times. Accordingly, the unified visualization interface 110 may configure the second visualization system 112 based on the XML configuration to match the start and end times for the selected data elements.

With continued reference to FIG. 1, in some examples, the unified visualization interface 110 may automatically invoke the second visualization system 112 by configuring the second visualization system 112 based on one of frame capture and automatic resizing, for example, of a visualization display. For example, visualization displays in different visualization systems may be arranged in different ways. Such arrangement may be based on screen size, open windows, font specifications, image resolution, and so forth. Accordingly, the unified visualization interface 110 may manage window size and screen location in multiple ways. For example, window size and location may be managed via a directed request to an operating system or window manager requesting a change from outside the second visualization system 112. In some examples, the unified visualization interface 110 may receive input data, based on mouse and keyboard controls, from users, and the unified visualization interface 110 may arrange window sizes based on the input data. In some examples, the unified visualization interface 110 may generate virtual keyboard and mouse events to provide the user with a mechanism to input data for window resize and location.

In some examples, applications in the second visualization system 112 may be pre-configured for fixed window sizes. The unified visualization interface 110 may resize and/or position windows in such applications by frame capture of the application windows from an auxiliary monitor, from a network connected auxiliary computer, or from a video capture card connected to an auxiliary computer. The frame capture may be cropped and scaled for inclusion in a combined visualization.

In some examples, system 100 may include a synchronization module (not shown in FIG. 1), managed via an interactive graphical user interface, to synchronize processing of the first visualization system 102 and the second visualization system 112. In some examples, synchronization module may be included in the unified visualization interface 110. In some examples, the unified visualization interface 110 may perform the functions of the synchronization module. Generally, to generate a unified visualization interface, floor control may be needed to manage existing visualization systems, such as the second visualization system 112, to ensure that the identified event from the first visualization system 102 is multicast and arrives at the second visualization system 112.

In some examples, such floor control may be managed by a user. For example, the synchronization module may provide the user resources to manage the first visualization system 102 via an interactive graphical user interface, and manage the second visualization system 112 via another interactive graphical user interface. In some examples, the synchronization module may confirm that the user has access to the floor control before an identified event selected by the user is multicast to the existing visualization systems, such as the second visualization system 112. Also, for example, the synchronization module may confirm that the identified event has been multicast and that the second visualization system 112 has been invoked in response to the multicast, before allowing the user to identify another event in another visualization system.

In some examples, the synchronization module may associate different existing visualization systems with corresponding shared data sources during consecutive user identified events. The association module 104 may ensure data synchronization via event-source associations. External commands may be utilized to confer multiple visualization systems so that identified events on one visualization system will affect other visualization systems.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth.

The components of system 100 may be a combination of hardware and programming for performing a designated visualization function. In some instances, each component may include a processor and a memory, while programming code is stored on that memory and executable by a processor to perform a designated visualization function.

For example, association module 104 may include hardware to physically store associations between identified event and the visualization function, and processors to physically process the associations. Association module 104 may include software algorithms to identify an event, the associated visualization function, process the associations, and/or share them over a network.

Association module 104 may include hardware, including physical processors and memory to house and process such software algorithms. Association module 104 may also include physical networks to be communicatively linked to the other components of system 100.

As another example, the multicasting module 106 may include hardware to physically store event data related to the identified event, and to generate the shared data source. Multicasting module 106 may include software programming to multicast the identified event to existing visualization systems. Multicasting module 106 may include software programming to dynamically interact with the other components of system 100 to receive event data, store it in the shared data source, and multicast the identified event. Multicasting module 106 may include hardware, including physical processors and memory to house and process such software algorithms. Multicasting module 106 may also include physical networks to be communicatively linked to the other components of system 100.

Likewise, the data sharing module 108 may include software programming that associates the event data with characteristics of the first visualization system 102. Data sharing module 108 may include software programming that associates the event data with an XML configuration. Data sharing module 108 may also include software programming to share the event data and the XML configuration with other components of system 100. Data sharing module 108 may include hardware, including physical processors and memory to house and process such software algorithms. Data sharing module 108 may also include physical networks to be communicatively linked to the other components of system 100.

Also, for example, the unified visualization interface 110 may include software algorithms to configure and invoke other visualization systems in response to the multicast of the identified event. Unified visualization interface 110 may include software algorithms to machine-read the event data and the XML configuration to configure another visualization system. Unified visualization interface 110 may include hardware, including physical processors and memory to house and process such software algorithms. Unified visualization interface 110 may include hardware to physically provide an interactive unified interface for the visualization systems. Unified visualization interface 110 may also include physical networks to be communicatively linked to the other components of system 100.

As another example, the synchronization module may include software programming to synchronize processing of multiple visualization systems. The synchronization module may include software programming to manage floor control based on user interactions. Synchronization module may include hardware, including physical processors and memory to house and process such software algorithms. Synchronization module may also include physical networks to be communicatively linked to the other components of system 100.

Likewise, visualization systems, such as the first visualization system 102 and the second visualization system 112, may include a combination of hardware and software programming. For example, the visualization systems may include interactive graphical user interfaces. Also, for example, the visualization systems may include a computing device to provide the interactive graphical user interfaces. The visualization systems may include software programming to interact with a user and receive feedback related to events and to perform associated visualization functions. The visualization systems may also include hardware, including physical processors and memory to house and process such software algorithms, and physical networks to be communicatively linked to the other components of system 100.

The computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. Computing device may include a processor and a computer-readable storage medium.

Figure 2B:
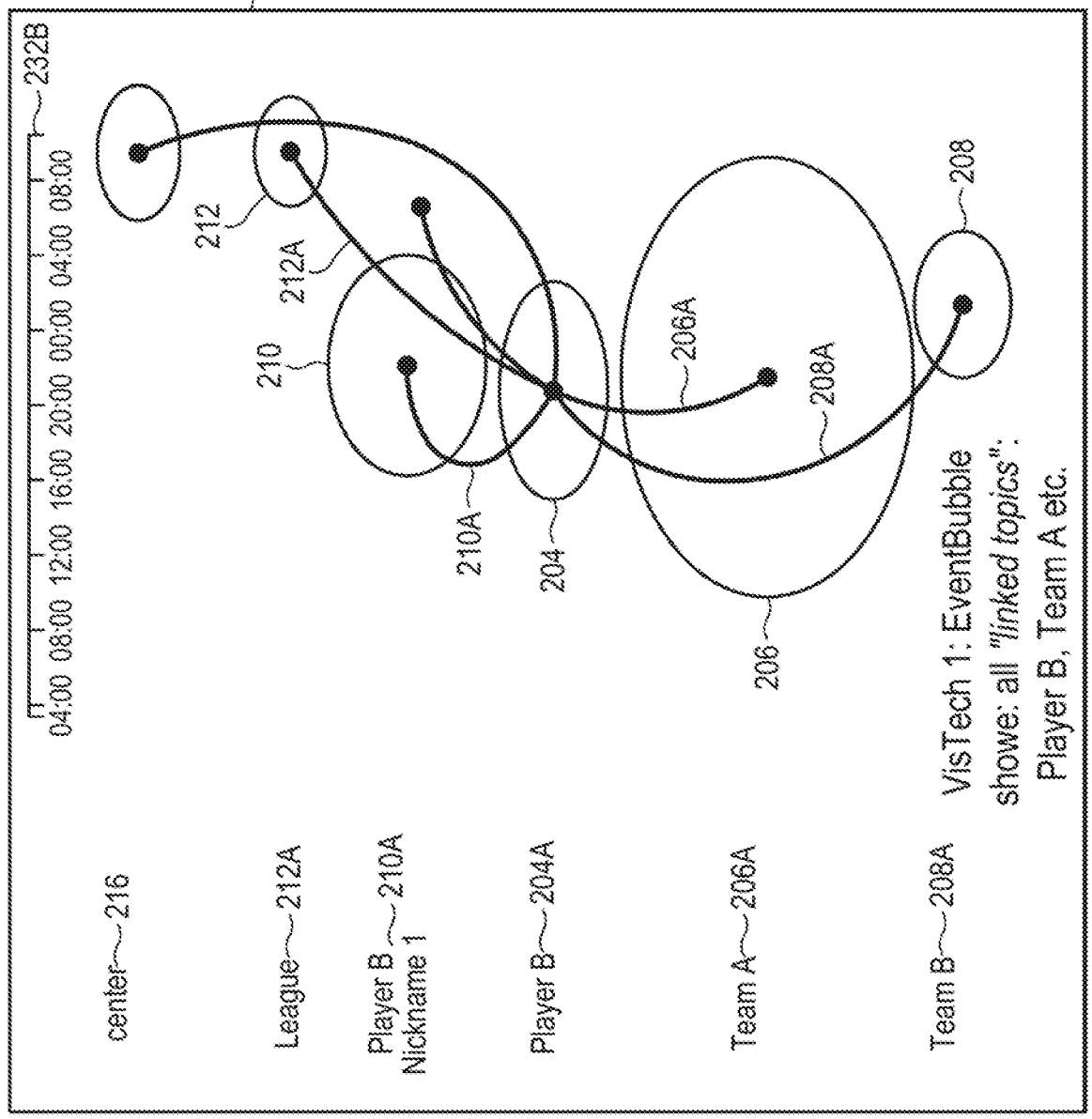
FIG. 2B illustrates the example first visualization system of FIG. 2A after the identified event illustrated in FIG. 2A is multicast.

FIG. 2B illustrates the example first visualization system 200A of FIG. 2A after the identified event illustrated in FIG. 2A is multicast. For example, when the association module 104 identifies that the event bubble 204 in FIG. 2A is selected, for example, when the user selects via a click 202 (in FIG. 2A), the event represented by event bubble 204 is then determined to be the identified event. The first visualization system 200A is reconfigured based on the identified event to generate a modified visualization system 200B (also referred to in FIG. 2B as VisTech 1 for Visual Technique 1). As illustrated, the modified first visualization system 200B may include a real-time display of events and topics during a time interval 232B ranging over 16 hours from, 04:00 to 08:00, in increments of 4 hours. Time interval 232B is a shortened version of the time interval 232 (of FIG. 2A).

Likewise, the modified first visualization system 200B may include event bubbles and topics linked to the identified event based on selection of the event bubble 204. For example, topic "Player B" 204A associated with event bubble 204 is illustrated. Also, for example, topic "Team A"

206A associated with event bubble 206, topic "Team B" 208A associated with event bubble 208, topic "Player B Nickname 1" 210A associated with event bubble 210, topic "League" 212A associated with event bubble 212, and topic "center" 216, are displayed. As illustrated, topics illustrated in FIG. 2A (and associated event bubbles) for "Player B Nickname 2" 214, "center" 216, "rest" 218, "return" 220, "player" 222, "suspension" 224, "front" 226, "river" 228, and "game" 230, are no longer included in the modified first visualization system 200B.

In some examples, the associated visualization function may be connections that represent associations between topics and/or events. For example, when the user selects via a click 202 (in FIG. 2A), the associated visualization function may connect the event represented by event bubble 204 with the event represented by event bubble 206. Such a connection may be represented by linking event bubble 204 and event bubble 206 via link 206A.

Likewise, the associated visualization function may connect the event represented by event bubble 204 with the event represented by event bubble 208. Such a connection may be represented by linking event bubble 204 and event bubble 208 via link 208A. Also, for example, the associated visualization function may connect the event represented by event bubble 204 with the event represented by event bubble 210. Such a connection may be represented by linking event bubble 204 and event bubble 210 via link 210A. As another example, the associated visualization function may connect the event represented by event bubble 204 with the event represented by event bubble 212. Such a connection may be represented by linking event bubble 204 and event bubble 212 via link 212A.

As described herein, the association module 104 may associate the identified event with an associated visualization function. Event data related to the identified event may be stored in a shared data source by the multicasting module 106. For example, event data may include event bubbles and topics that are included in the modified first visualization system 200B, as well as event bubbles and topics that are not included in the modified first visualization system 200B. Also, for example, event data may include the shortened time interval 232B. The data sharing module 108 may generate XML configuration for the event data indicative of changes in color, scaling, and location of, for example, the event bubbles and topics in the modified first visualization system 200B.

The multicasting module 106 may multicast the identified event and the associated visualization function to multiple visualization systems. In some examples, the unified visualization interface 110 may configure and invoke such multiple visualization systems.

Figure 3A:
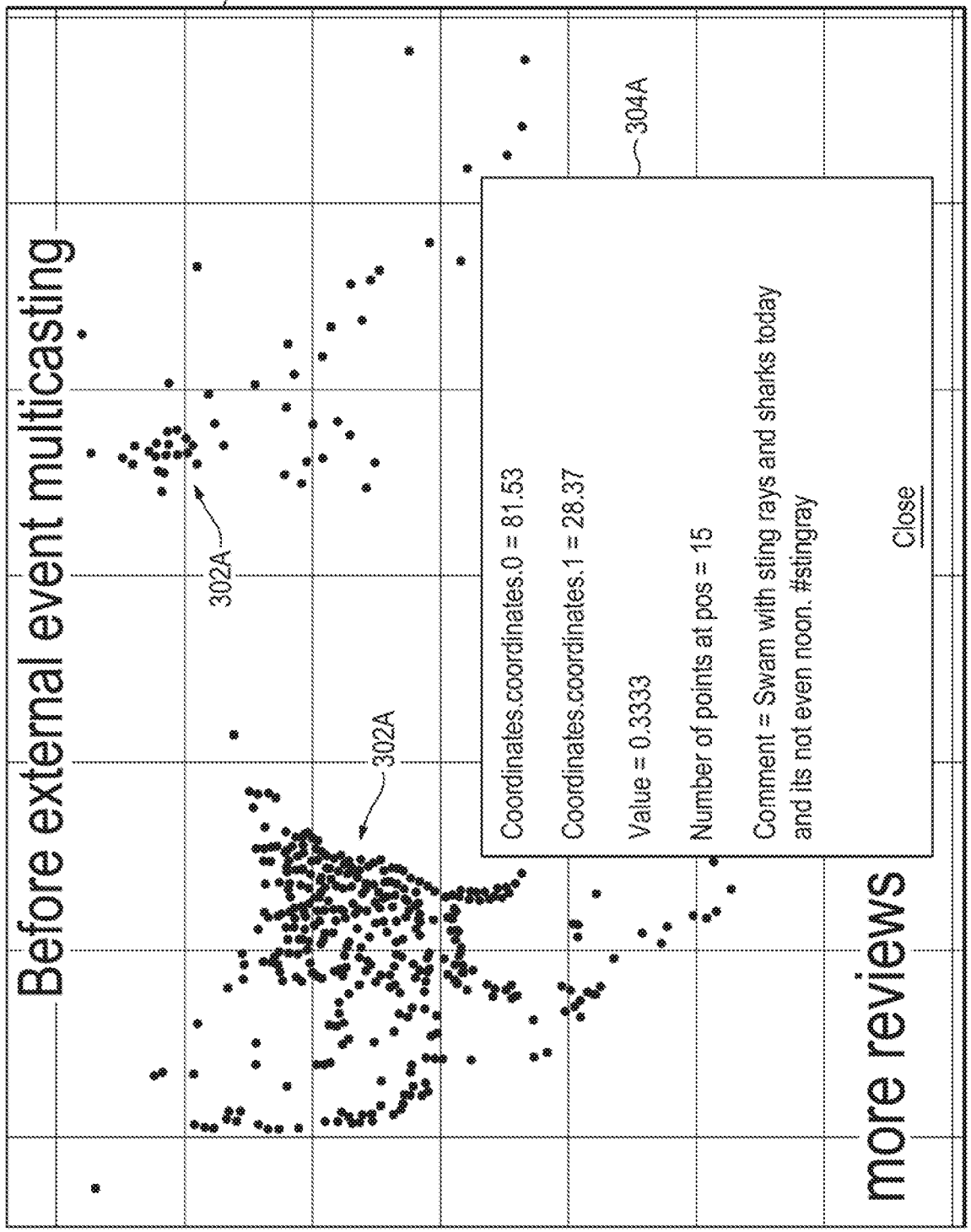
FIG. 3A illustrates an example visualization system before the identified event illustrated in FIG. 2A is multicast.

FIG. 3A illustrates an example visualization system 300A before the identified event illustrated in FIG. 2A is multicast. As illustrated, geolocations of data elements 302A are illustrated in the visualization system 300A. In some examples, the geolocations of the data elements 302A may be represented by pixel colors. In some examples, hovering over a data element, represented by a pixel, may generate a pop-up 304A with a description of the data element. For example, pop-up 304A may include coordinates of the data element (e.g., latitude and longitude), a value such as 0.3333, number of points at position ("pos") such as 15, and a comment such as "Swam with sting rays and sharks today and its not even noon. #stingray".

Figure 3B:
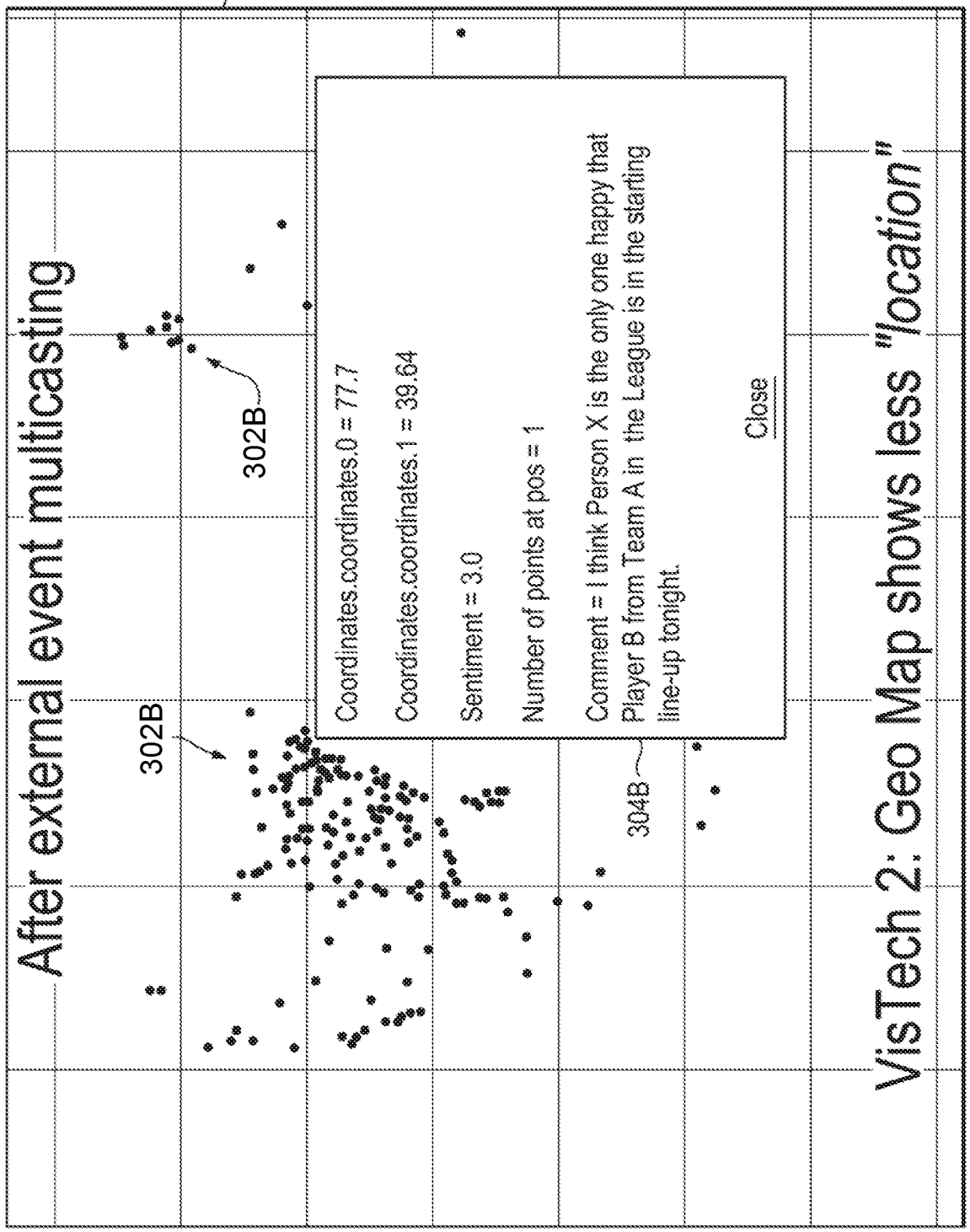
FIG. 3B illustrates the example visualization system of FIG. 3A after the identified event illustrated in FIG. 2A is multicast.

FIG. 3B illustrates the example visualization system 300A of FIG. 3A after the identified event illustrated in FIG. 2A is multicast. The modified visualization system 300B (also referred to as VisTech 2 for Visual Technique 2) may be configured and invoked by the unified visualization interface 110 based on the event data and XML configuration. As illustrated, geolocations of data elements 302B are illustrated in the modified visualization system 300B. Based on event data indicative of the date of the identified event, the modified visualization system 300B may display events from 08-05. Based on event data indicative of the time of the identified event, the modified visualization system 300B may display events from a shorter time interval. As illustrated, the number of data elements 302B after the identified event is multicast may be considerably fewer than the number of data elements 302A illustrated in FIG. 3A, before the identified event is multicast. Once the identified event is multicast, only data elements relevant to the identified event may be included in the modified visualization system 300B. For example, based on the identified event, the data element associated with the pop-up 304A of FIG. 3A may no longer be included. However, a data element associated with pop-up 304B may be included. For example, pop-up 304B may include coordinates of the data element (e.g., latitude and longitude), a sentiment such as 3.0, number of points at pos such as 1, and a comment such as "I think Person X is the only one happy that Player B from Team A in the League is in the starting line-up tonight". "Player B", "Team A", and "League" may be topic "Player B" 204A associated with the event bubble 204, topic "Team A" 206A associated with the event bubble 206, and topic "Team B" 208A associated with the event bubble 208, as illustrated in FIG. 2B.

Figure 4A:
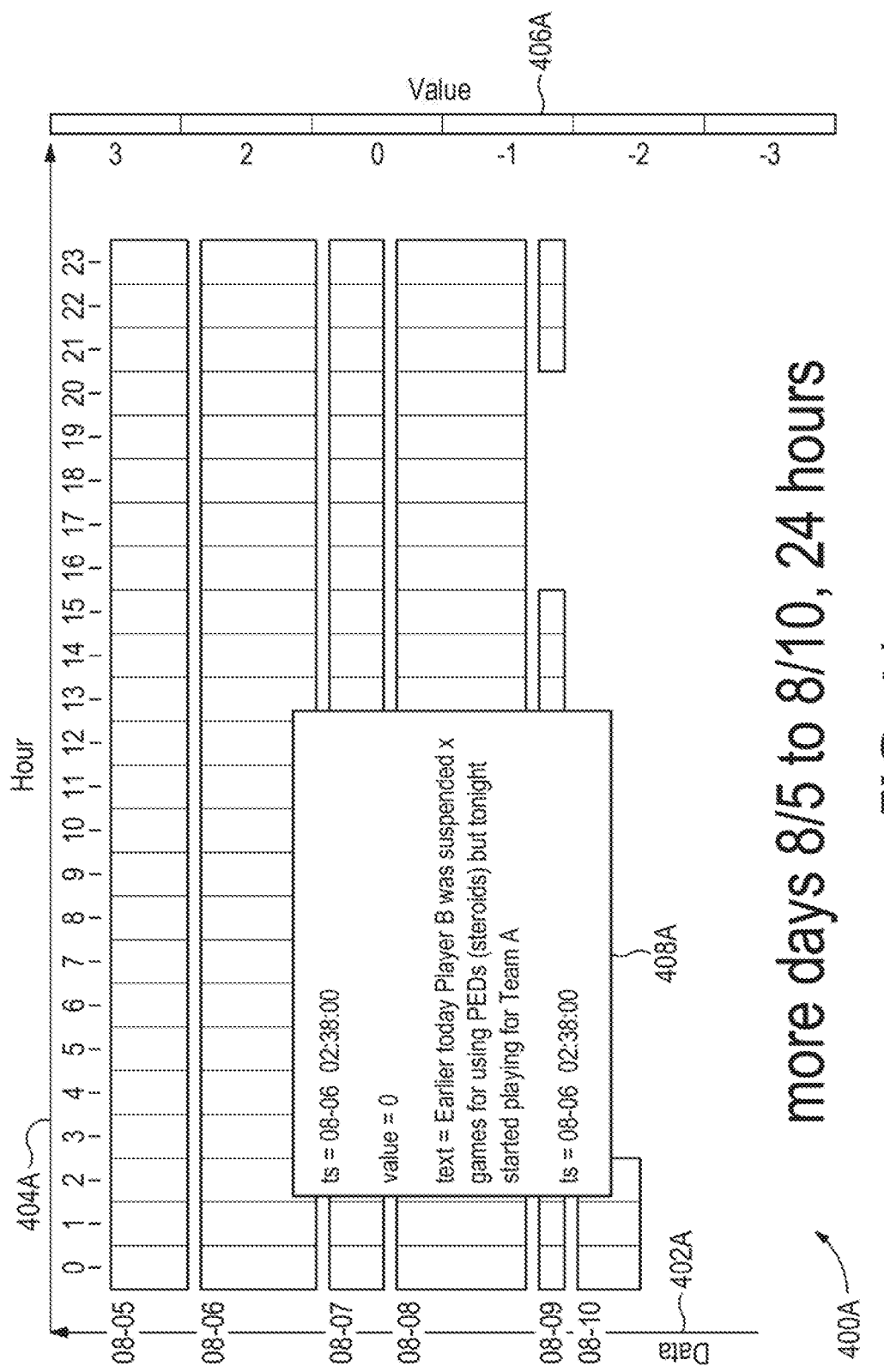
FIG. 4A illustrates another example visualization system before the identified event illustrated in FIG. 2A is multicast.

FIG. 4A illustrates another example visualization system 400A before the identified event illustrated in FIG. 2A is multicast. Visualization system 400A may display an event based on coordinates that include a date when the event occurred, a time when the event occurred, and a value associated with the event. The dates may be represented on a date axis 402A with dates ranging from 08-05 to 08-10. The times may be represented on a time axis 404A with times ranging from 0 to 24 hours. The values may be represented via a value color spectrum 406A with colors ranging from red to green. Hovering over an event may display a pop-up 408A with data related to the event. For example, pop-up 408A may include a first time stamp, ts=08-06 02:38:00; a value=0; a text such as "Earlier today Player B was suspended x games for using PEDs (steroids) but tonight started playing for Team A"; and a second time stamp, ts=08-06 02:38:00. "Player B" may be topic "Player B" 204A associated with the event bubble 204, and "Team A" may be topic "Team A" 206A associated with the event bubble 206, as illustrated in FIG. 2A.

Figure 4B:
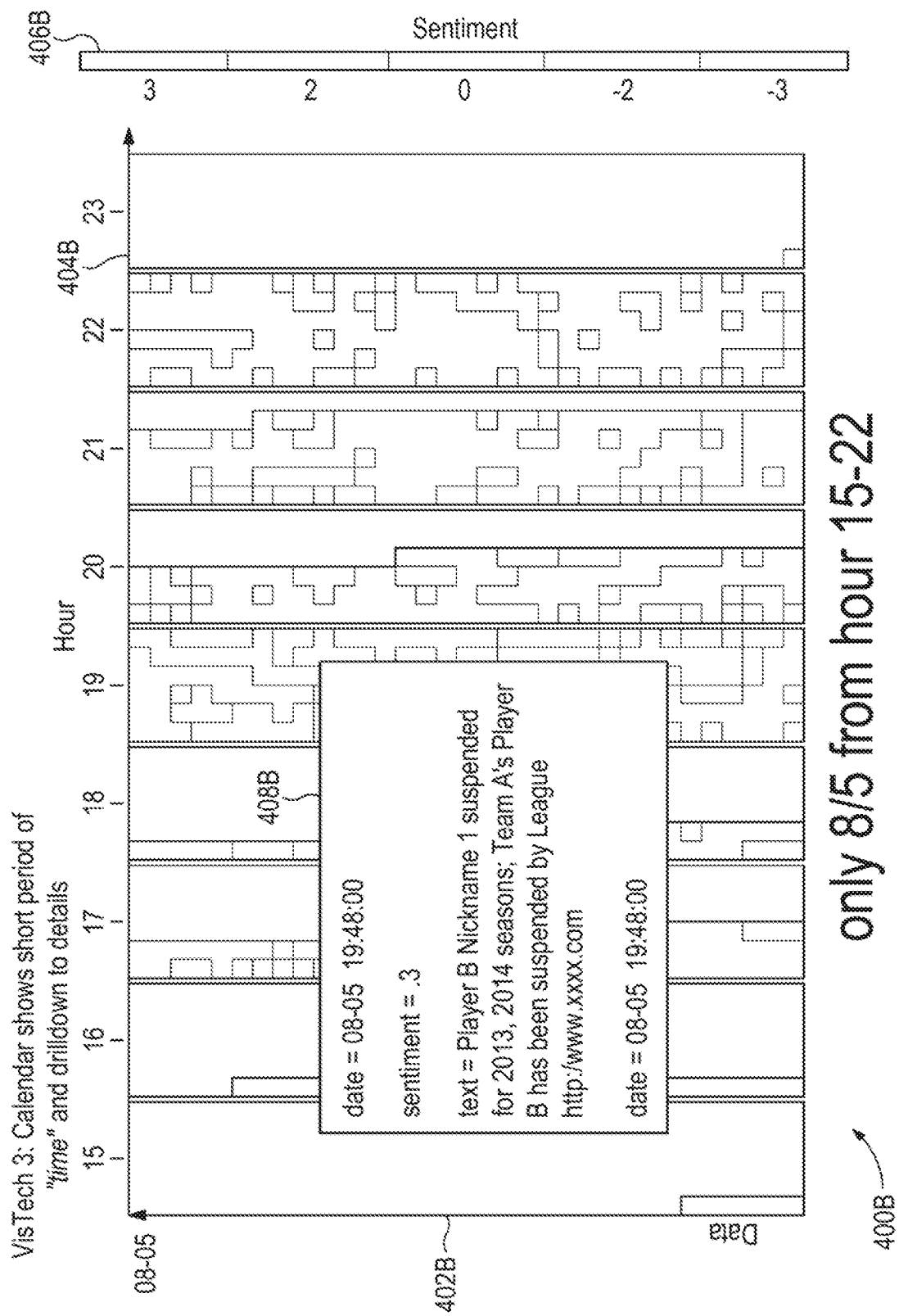
FIG. 4B illustrates the example visualization system of FIG. 4A after the identified event illustrated in FIG. 2A is multicast.

FIG. 4B illustrates the example visualization system 400A of FIG. 4A after the identified event illustrated in FIG. 2A is multicast. The modified visualization system 400B (also referred to as VisTech 3 for Visual Technique 3) may be configured and invoked by the unified visualization interface 110 based on the event data and XML configuration. As illustrated, based on event data indicative of the date of the identified event, the modified visualization system 400B may display events from 08-05. Accordingly, date axis 402A of FIG. 4A may be modified to date axis 402B to display the date 08-05 instead of dates ranging from 08-05 to 08-10. Likewise, based on event data indicative of the time of the identified event, the modified visualization system 400B may display events from a shorter time interval. Accordingly, time axis 404A of FIG. 4A may be modified to time axis 404B to display times in the range from 15 to 22 hours instead of times ranging from 0 to 24 hours. In some examples, values may be represented via a value color spectrum 406B, which may be identical to the value color spectrum 406A of FIG. 4A.

As illustrated, the number of events illustrated in the modified visualization system 400B after the identified event is multicast may be considerably fewer than the number of events illustrated in the visualization system 400A illustrated in FIG. 4A, before the identified event is multicast. Once the identified event is multicast, only data elements relevant to the identified event may be included in the modified visualization system 400B. For example, based on the identified event, the event associated with the pop-up 408A of FIG. 4A may no longer be included because that event occurred on 08-06. However, an event associated with pop-up 408B may be included because that event occurred on 08-05. For example, pop-up 408B may include a first time stamp, ts=08-05 19:48:00; a sentiment=0.3; a text such as "Nickname Player B suspended for 2013, 2014 seasons; Team A's Player A has been suspended by League http:/www.xxxx-.com"; and a second time stamp, ts=08-05 19:48:00. "Player B Nickname 1" may be topic "Player B Nickname 1" 210A associated with the event bubble 210, "Team A" may be topic "Team A" 206A associated with the event bubble 206, and "Player B" may be topic "Player B" 204A associated with the event bubble 204, as illustrated in FIG. 2B.

Figure 5A:
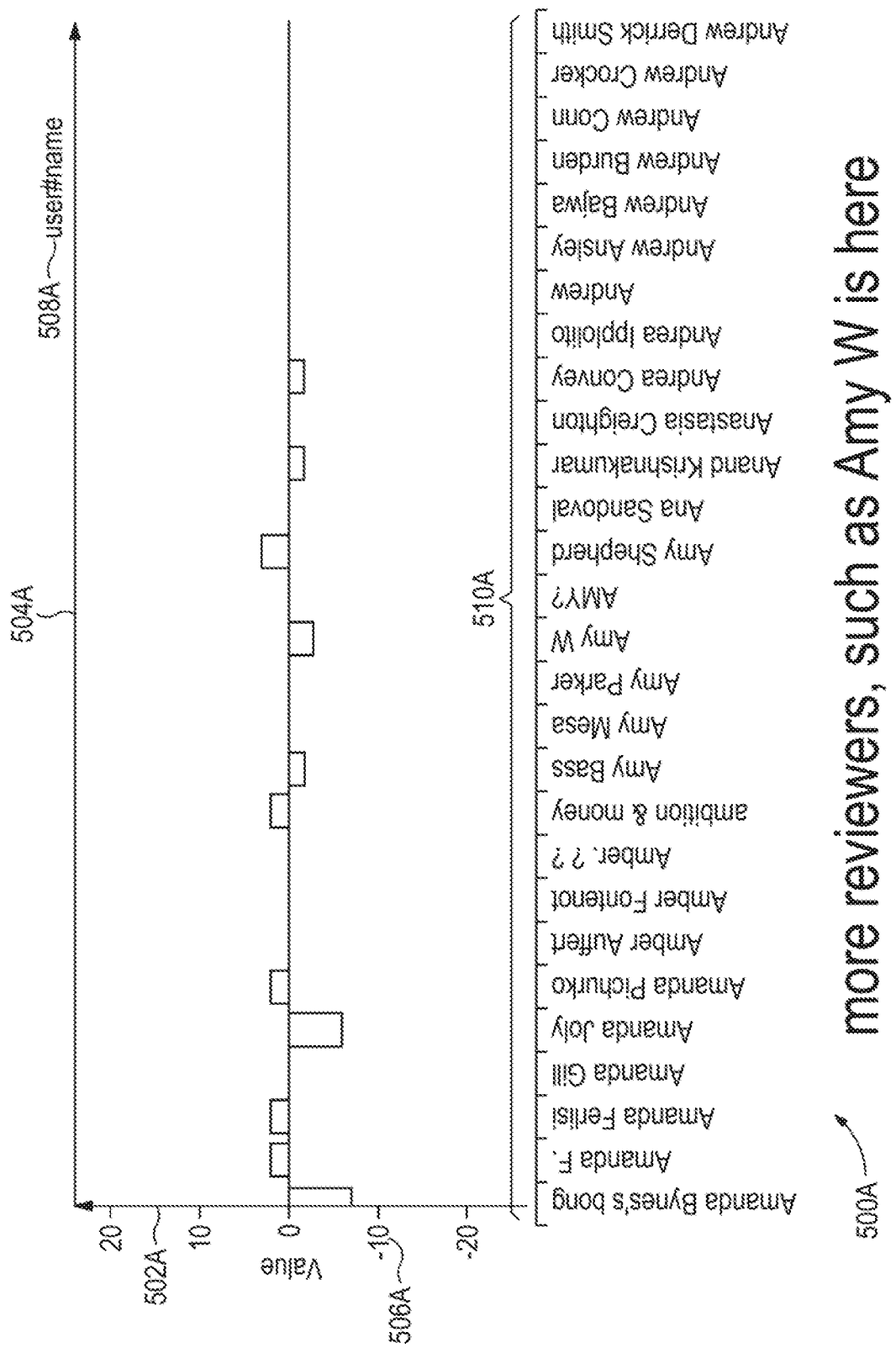
FIG. 5A illustrates another example visualization system before the identified event illustrated in FIG. 2A is multicast.

FIG. 5A illustrates another example visualization system 500A before the identified event illustrated in FIG. 2A is multicast. Visualization system 500A may display an event based on coordinates that include a value for the event, and a username for a reviewer associated with a comment related to the event. The values 506A may be represented on a value axis 502A with values 506A ranging from −20 to +20. The usernames 508A may be represented on a username axis 504A with usernames in the username list 510A. As indicated, Amy W may be a reviewer included in the username list 510A.

Figure 5B:
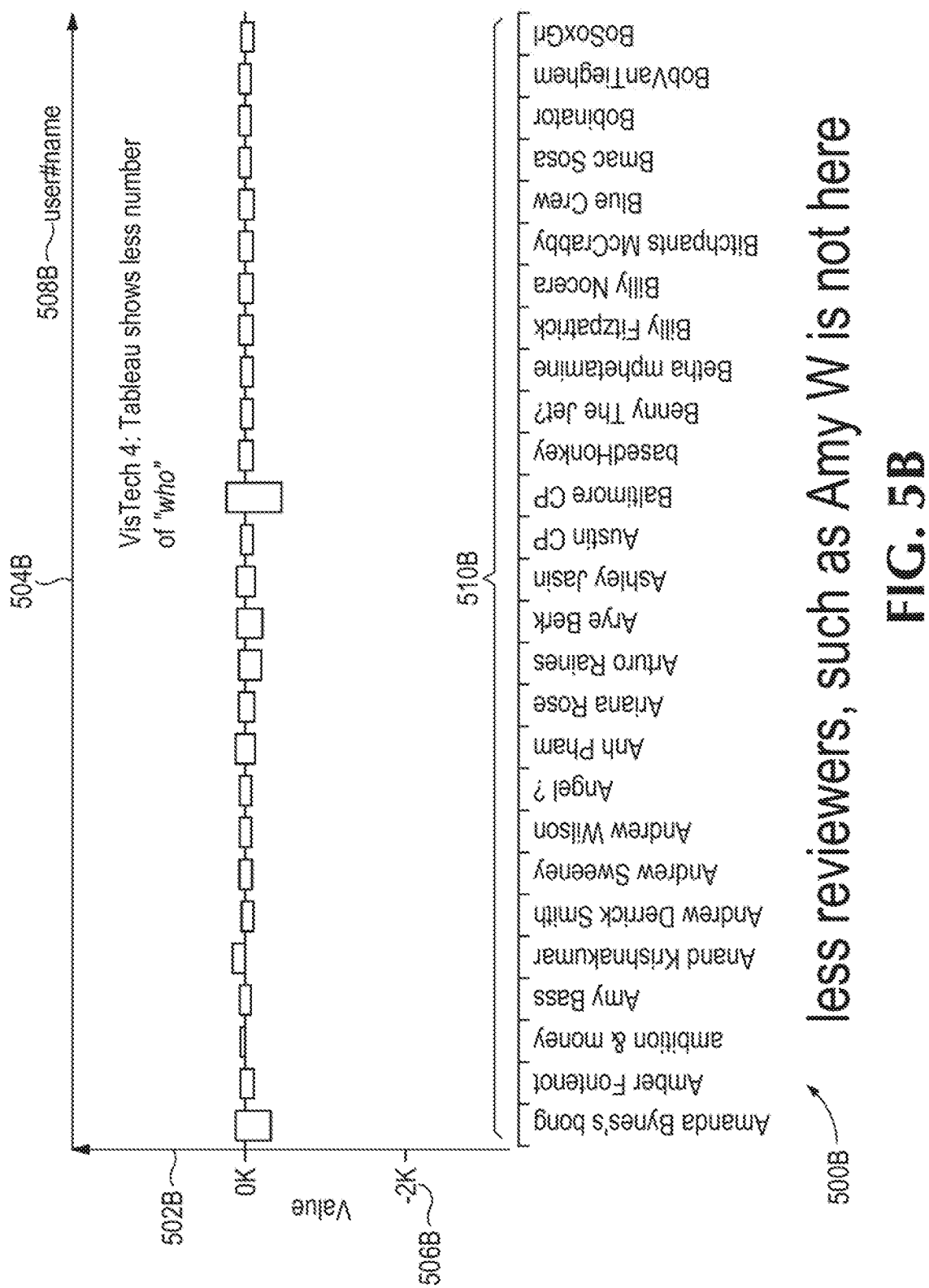
FIG. 5B illustrates the example visualization system of FIG. 5A after the identified event illustrated in FIG. 2A is multicast.

FIG. 5B illustrates the example visualization system 500A of FIG. 5A after the identified event illustrated in FIG. 2A is multicast. The modified visualization system 500B (also referred to as VisTech 4 for Visual Technique 4) may be configured and invoked by the unified visualization interface 110 based on the event data of XML configuration. As illustrated, based on event data indicative of the identified event, the modified visualization system 500B may display fewer review, Accordingly, value axis 502B to display values 506B in the range−2 to 1 instead of values 506B in the range−20 to +20. Also, for example, the user axis 508A of FIG. 5A may be modified to username axis 504B to display usernames 508B of reviewers in a smaller collection 510B instead of the larger collection 510A of FIG. 5A.

As illustrated, the number of reviewers illustrated in the modified visualization system 500B after the identified event is multicast may be considerably fewer than the number of reviewers illustrated in the visualization system 500A illustrated in FIG. 5A, before the identified event is multicast. Once the identified event is multicast, only data elements relevant to the identified event may be included in the modified visualization system 500B. For example, based on the identified event, the reviewer named Amy W who appeared in the larger collection 510A of FIG. 5A, no longer appears in the smaller collection 510B.

Figure 6B:
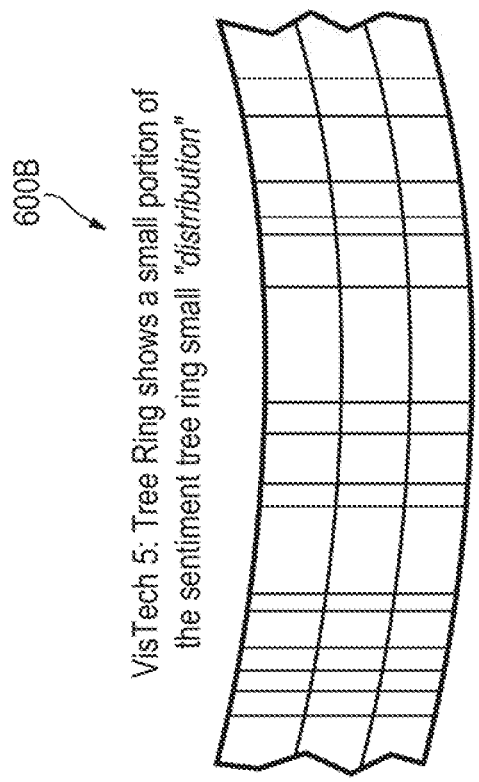
FIG. 6B illustrates the example visualization system of FIG. 6A after the identified event illustrated in FIG. 2A is multicast.
Figure 6A:
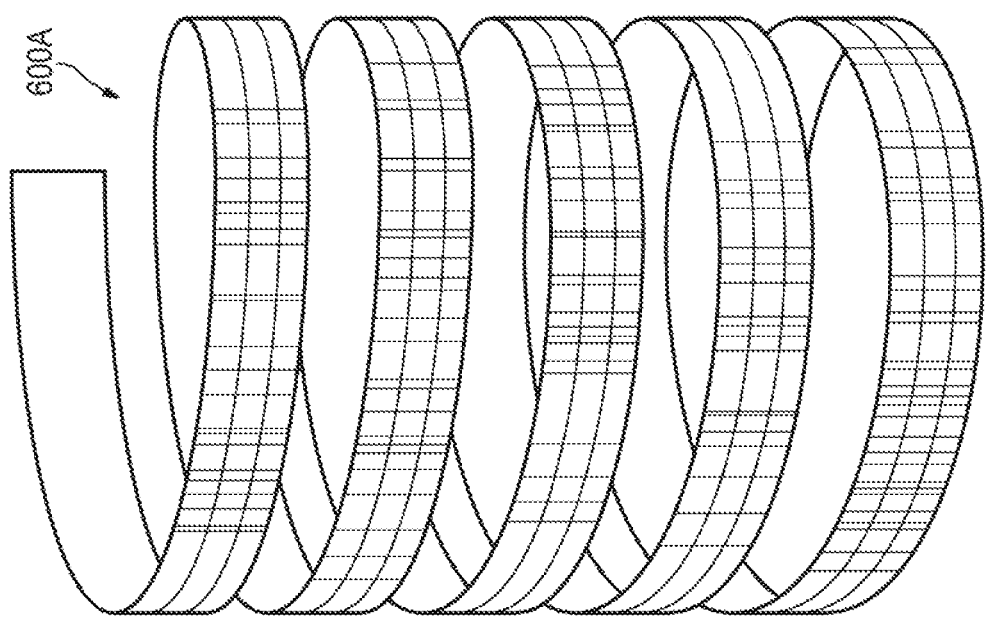
FIG. 6A illustrates another example visualization system before the identified event illustrated in FIG. 2A is multicast.

FIG. 6A illustrates another example visualization system 600A before the identified event illustrated in FIG. 2A is multicast. Visualization system 600A may be a three-dimensional pixel-based helix representation of data elements representing events. Visualization system 600A may display an event based on coordinates that include a date when the event occurred, a time when the event occurred, and a value associated with the event. As illustrated, the dates included range from 08/05 to 08/10, and the time ranges over a 0-24 hour period. The values may be represented via a value color spectrum.

FIG. 6B illustrates the example visualization system 600A of FIG. 6A after the identified event illustrated in FIG. 2A is multicast. The modified visualization system 600B (also referred to as VisTech 5 for Visual Technique 5) may be configured and invoked by the unified visualization interface 110 based on the event data and XML configuration. As illustrated, based on event data indicative of the date of the identified event, the modified visualization system 600B may display events from 08-05 instead of from 08/05 to 08/10 as illustrated in FIG. 6A. Likewise, based on event data indicative of the time of the identified event, the modified visualization system 600B may display events from a time interval ranging from 15-22 instead of from 0-24 hours as illustrated in FIG. 6A.

Referring again to FIG. 1, in some examples, the unified visualization interface 110 may generate an interface that includes the second visualization system 112. In some examples, the unified visualization interface 110 may generate an interface that includes the first visualization system 102 and the second visualization system 112. Although the system 100 has been described in terms of invoking the second visualization system 112 based on an identified event in the first visualization system 102, the process may be continued iteratively. For example, after the second visualization system 112 is invoked, a second event may be identified in the second visualization system 112, and the first visualization system 102 may be invoked based on the second event that is identified. In such instances, the roles of the first visualization system 102 and the second visualization system 112 in system 100 may be interchanged.

In some examples, the unified visualization interface 110 may generate an interface that includes the first visualization system 102, the second visualization system 112, and a third visualization system (not illustrated in FIG. 1). In some examples, the third visualization system may be invoked based on the second event that is identified. In such instances, the first visualization system 102 may perform the role of the second visualization system 112, whereas the second visualization system 112 may perform the role of the third visualization system.

In some examples, the first visualization system 102 and the third visualization system may be simultaneously invoked based on the second event that is identified. In such examples, the first visualization system 102 may perform the role of the second visualization system 112, whereas the second visualization system 112 may perform the roles of the first visualization system 102 and the third visualization system. As described herein, multiple visualization systems may be configured and invoked by the unified visualization interface 110.

Figure 7:
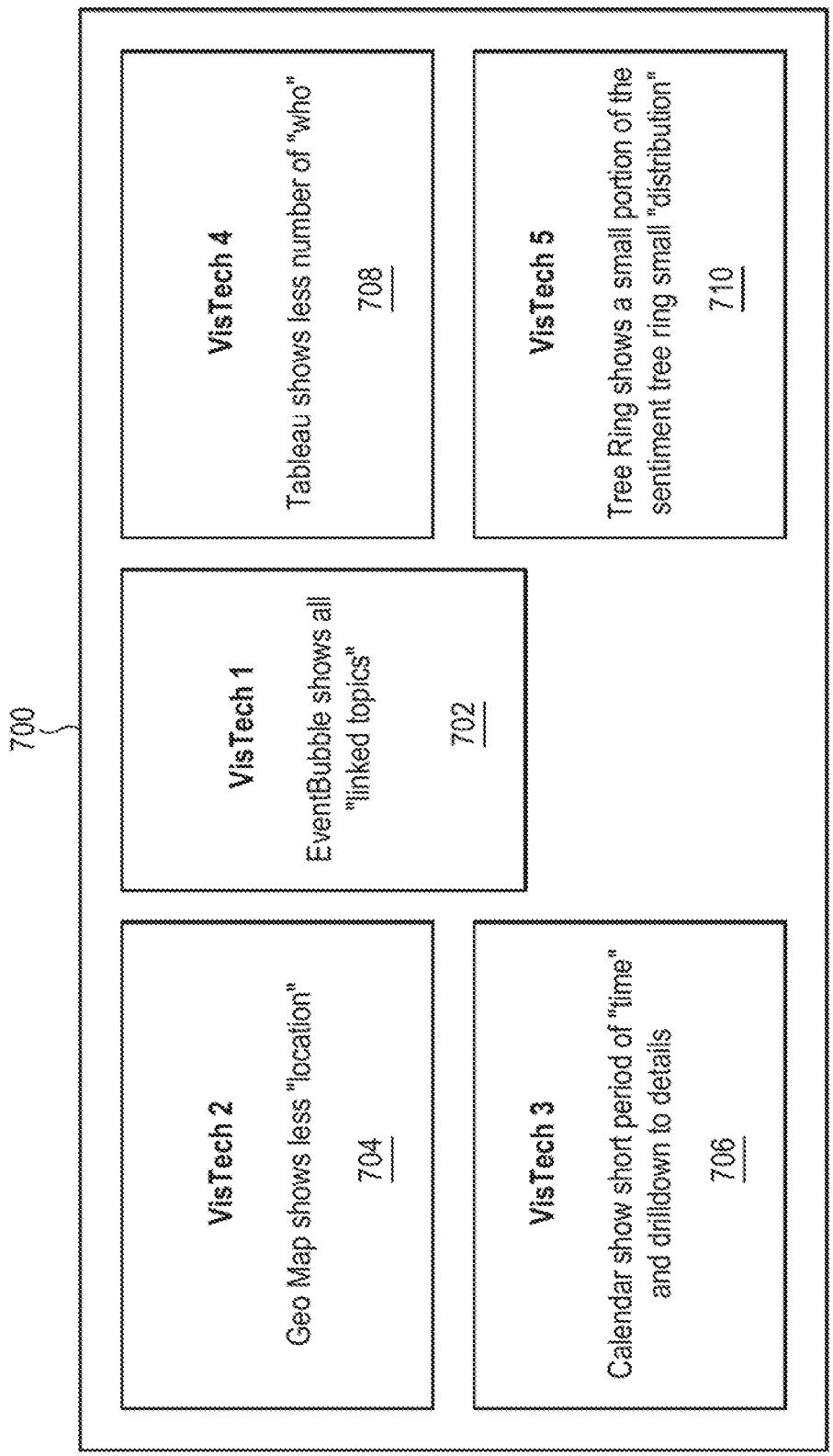
FIG. 7 an example unified visualization interface after the identified event illustrated in FIG. 2A is multicast.

FIG. 7 an example unified visualization interface 700 after the identified event illustrated in FIG. 2A is multicast. In some examples, VisTech 1 702 may be the modified first visualization system 200B of FIG. 2B illustrating event bubbles and linked topics. In some examples, VisTech 2 704 may be the modified first visualization system 300B of FIG. 3B illustrating a geo map with geolocations of events. In some examples, VisTech 3 706 may be the modified first visualization system 400B of FIG. 4B illustrating a calendar with shorter periods of time and a drill down to details of events. In some examples, VisTech 4 708 may be the modified first visualization system 500B of FIG. 5B illustrating a tableau with fewer reviewers. In some examples, VisTech 5 710 may be the modified first visualization system 600B of FIG. 6B illustrating a pixel-based helix representation with a smaller portion of the larger tree ring from FIG. 6A. As described herein, VisTech 1 702, VisTech 2 704, VisTech 3 706, VisTech 4 708, and VisTech 5 710 may interchangeably play the role of the first visualization system 102 and the second visualization system 112 as described with reference to the system in FIG. 1.

Figure 8:
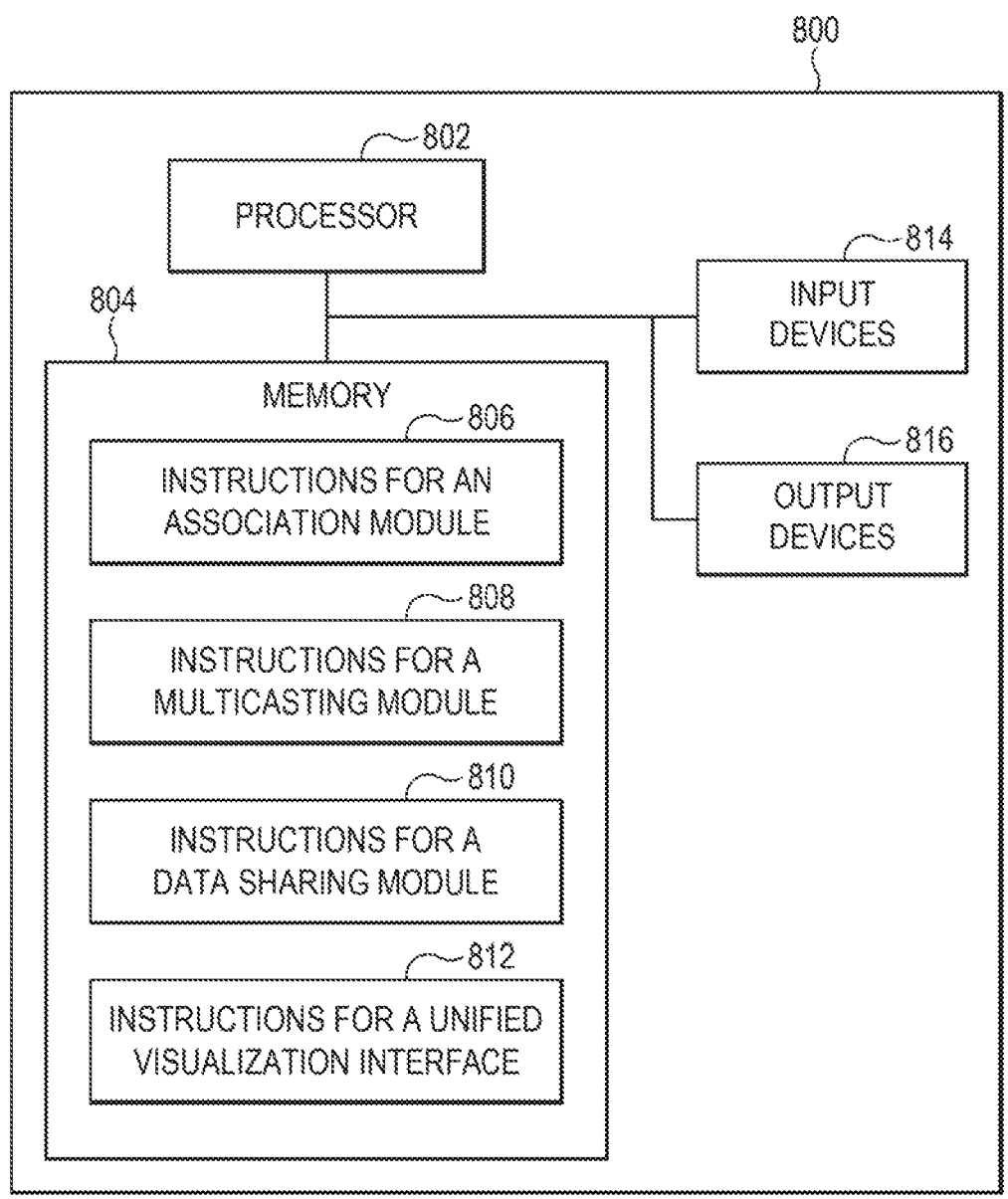
FIG. 8 is a block diagram illustrating one example of a processing system for implementing the system for a unified visualization interface.

FIG. 8 is a block diagram illustrating one example of a processing system 800 for implementing the system 100 for a unified visualization interface. Processing system 800 includes a processor 802, a memory 804, input devices 814, and output devices 816. Processor 802, memory 804, input devices 814, and output devices 816 are coupled to each other through communication link (e.g., a bus).

Processor 802 includes a Central Processing Unit (CPU) or another suitable processor. In some examples, memory 804 stores machine readable instructions executed by processor 802 for operating processing system 800. Memory 804 includes any suitable combination of volatile and/or non-volatile memory, such as combinations of Random Access Memory (RAM), Read-Only Memory (ROM), flash memory, and/or other suitable memory.

Memory 804 also stores instructions to be executed by processor 802 including instructions for an association module 806, instructions for a multicasting module 808, instructions for a data sharing module 810, and instructions for a unified visualization interface 812. In some examples, instructions for an association module 806, instructions for a multicasting module 808, instructions for a data sharing module 810, and instructions for a unified visualization interface 812, include instructions for the association module 104, instructions for the multicasting module 106, instructions for the data sharing module 108, and instructions for the unified visualization interface 110 respectively, as previously described and illustrated with reference to FIG. 1.

Processor 802 executes instructions for an association module 806 to associate an identified event in a first visualization system with a visualization function performed by the first visualization system. Processor 802 executes instructions for a multicasting module 808 to store event data related to the event and the associated visualization function in a shared data source, and to multicast the identified event to a second visualization system. In some examples, processor 802 executes instructions for a multicasting module 808 to generate the shared data source based on data received from the association module.

Processor 802 executes instructions for a data sharing module 810 to associate the event data with characteristics of the first visualization system, and share, in response to the multicast of the identified event, the shared data source with the second visualization system. In some examples, processor 802 executes instructions for a data sharing module 810 to associate the event data with characteristics of the first visualization system, including one of scale, color map, input parameters, and data handling instructions. In some examples, processor 802 executes instructions for a data sharing module 810 to associate the event data with an XML configuration.

Processor 802 executes instructions for a unified visualization interface 812 to automatically invoke, without software changes, the second visualization system in response to the multicast of the identified event, the invoking based on the shared data source including the characteristics of the first visualization system. In some examples, processor 802 executes instructions for a unified visualization interface 812 to unify starting procedures for existing visualization systems in a common interface. In some examples, processor 802 executes instructions for a unified visualization interface 812 to automatically invoke the second visualization system based on one of a navigation to a specified URL, an invocation of API requests, a generation of virtual mouse events, a generation of virtual keyboard events, and a manipulation of session variables. In some examples, the API request may include a REST API request.

In some examples, processor 802 executes instructions for a unified visualization interface 812 to automatically invoke the second visualization system by configuring the second visualization system. In some examples, processor 802 executes instructions for a unified visualization interface 812 to automatically invoke the second visualization system by configuring the second visualization system based on one of frame capture and automatic resizing.

In some examples, processor 802 executes instructions for a synchronization module (not illustrated in FIG. 8), managed via an interactive graphical user interface, to synchronize processing of the first visualization system and the second visualization system. In some examples, processor 802 executes instructions for a synchronization module to provide a user with virtual resources for managing floor control for existing visualization systems. In some examples, processor 802 executes instructions for a synchronization module to confirm that the user has access to the floor control before an identified event selected by the user is multicast to the existing visualization systems. In some examples, processor 802 executes instructions for a synchronization module to confirm that the identified event has been multicast and that the relevant visualization systems have been invoked in response to the multicast, before allowing the user to identify another event in another visualization system. In some examples, processor 802 executes instructions for a synchronization module to associate different existing visualization systems with corresponding shared data sources during consecutive user identified events.

Input devices 814 include a keyboard, mouse, data ports, and/or other suitable devices for inputting information into processing system 800. In some examples, input devices 814, such as a computing device, are used by the unified visualization interface 110 to receive, from a user, input data related to floor control. Output devices 816 include a monitor, speakers, data ports, and/or other suitable devices for outputting information from processing system 800. In some examples, output devices 816 are used to provide the existing visualization systems to a computing device.

Figure 9:
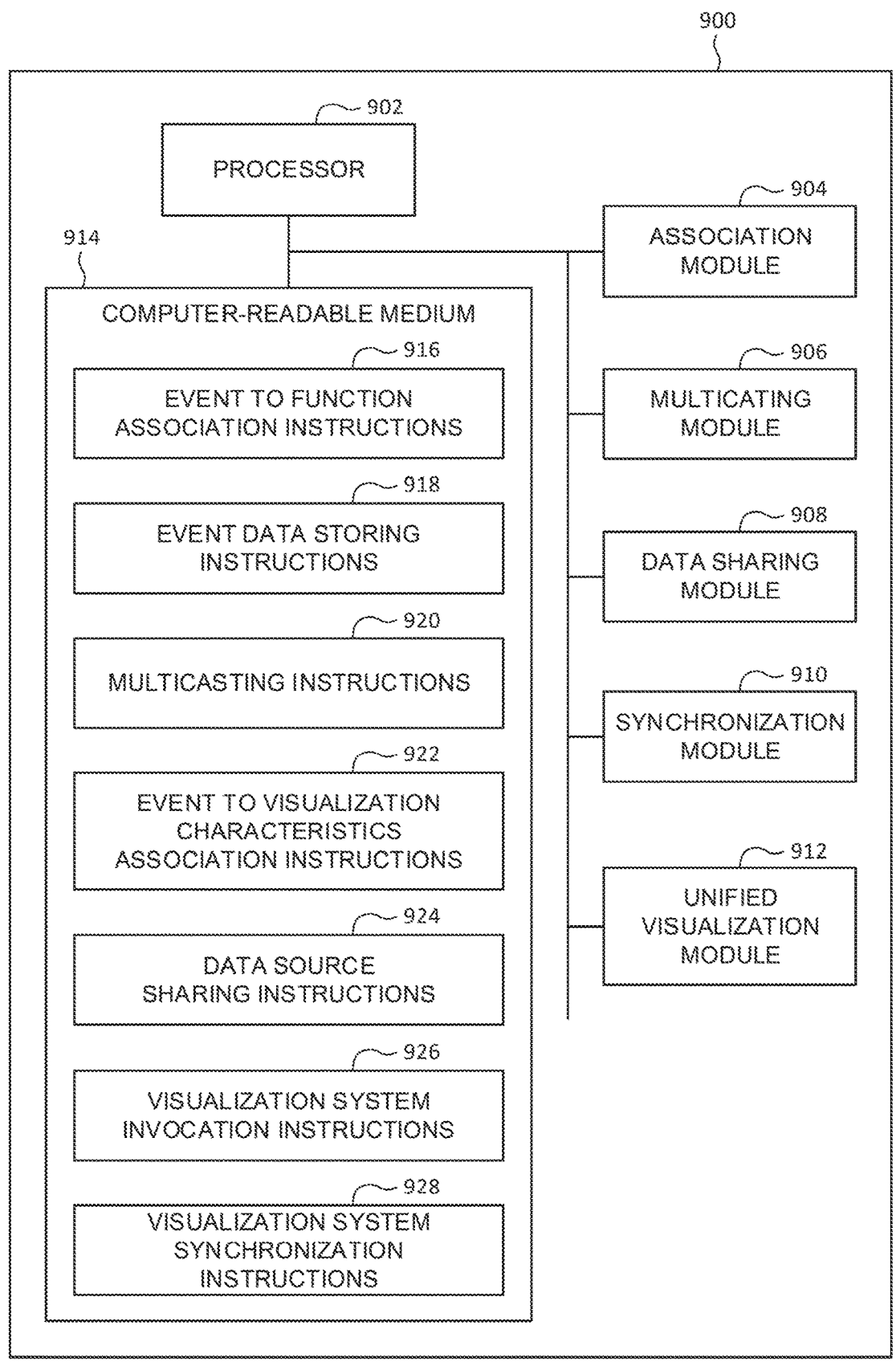
FIG. 9 is a block diagram illustrating one example of a computer readable medium for a unified visualization interface.

FIG. 9 is a block diagram illustrating one example of a computer readable medium for a unified visualization interface. Processing system 900 includes a processor 902, a computer readable medium 914, an association module 904, a multicasting module 906, a data sharing module 908, a synchronization module 910, and a unified visualization interface 912.

Processor 902, computer readable medium 914, association module 904, multicasting module 906, data sharing module 908, synchronization module 910, and unified visualization interface 912 are coupled to each other through communication link (e.g., a bus).

Processor 902 executes instructions included in the computer readable medium 914. Computer readable medium 914 includes event to visualization function association instructions 916 of an association module 904 to associate an identified event in a first visualization system with a visualization function performed by the first visualization system.

Computer readable medium 914 includes event data storing instructions 918 of a multicasting module 906 to store event data related to the identified event and the associated visualization function in a shared data source.

Computer readable medium 914 includes multicasting instructions 920 of a multicasting module 906 to multicast the identified event to a second visualization system.

Computer readable medium 914 includes event to visualization characteristics association instructions 922 of a data sharing module 908 to associate the event data with characteristics of the first visualization system, the characteristics including one of scale, color map, input parameters, and data handling instructions.

Computer readable medium 914 includes data source sharing instructions 924 of a data sharing module 908 to share, in response to the multicast of the identified event, the shared data source with the second visualization system.

Computer readable medium 914 includes visualization system invocation instructions 926 of a unified visualization interface 912 to invoke, without software changes, the second visualization system in response to the multicast of the identified event, the invoking based on the shared data source including the characteristics of the first visualization system. In some examples, computer readable medium 914 includes visualization system invocation instructions 926 of a unified visualization interface 912 to automatically invoke the second visualization system based on one of a navigation to a specified URL, an invocation of API requests, a generation of virtual mouse events, a generation of virtual keyboard events, and a manipulation of session variables. In some examples, the API requests may include a REST API requests.

Computer readable medium 914 includes visualization system synchronization instructions 928 of a synchronization module 910 to synchronize processing of the first visualization system and the second visualization system.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the Computer readable medium 914 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 900 are identified and refer to a combination of hardware and programming configured to perform a designated visualization function. As illustrated in FIG. 9, the programming may be processor executable instructions stored on tangible computer readable medium 914, and the hardware may include processor 902 for executing those instructions. Thus, computer readable medium 914 may store program instructions that, when executed by processor 902, implement the various components of the processing system 900.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 914 may be any of a number of memory components capable of storing instructions that can be executed by Processor 902. Computer readable medium 914 may be non-transitory in the sense that it does not encompass a transitory signal but instead is made up of one or more memory components configured to store the relevant instructions. Computer readable medium 914 may be implemented in a single device or distributed across devices. Likewise, processor 902 represents any number of processors capable of executing instructions stored by computer readable medium 914.

Processor 902 may be integrated in a single device or distributed across devices. Further, computer readable medium 914 may be fully or partially integrated in the same device as processor 902 (as illustrated), or it may be separate but accessible to that device and processor 902. In some examples, computer readable medium 914 may be a machine-readable storage medium.

Figure 10:
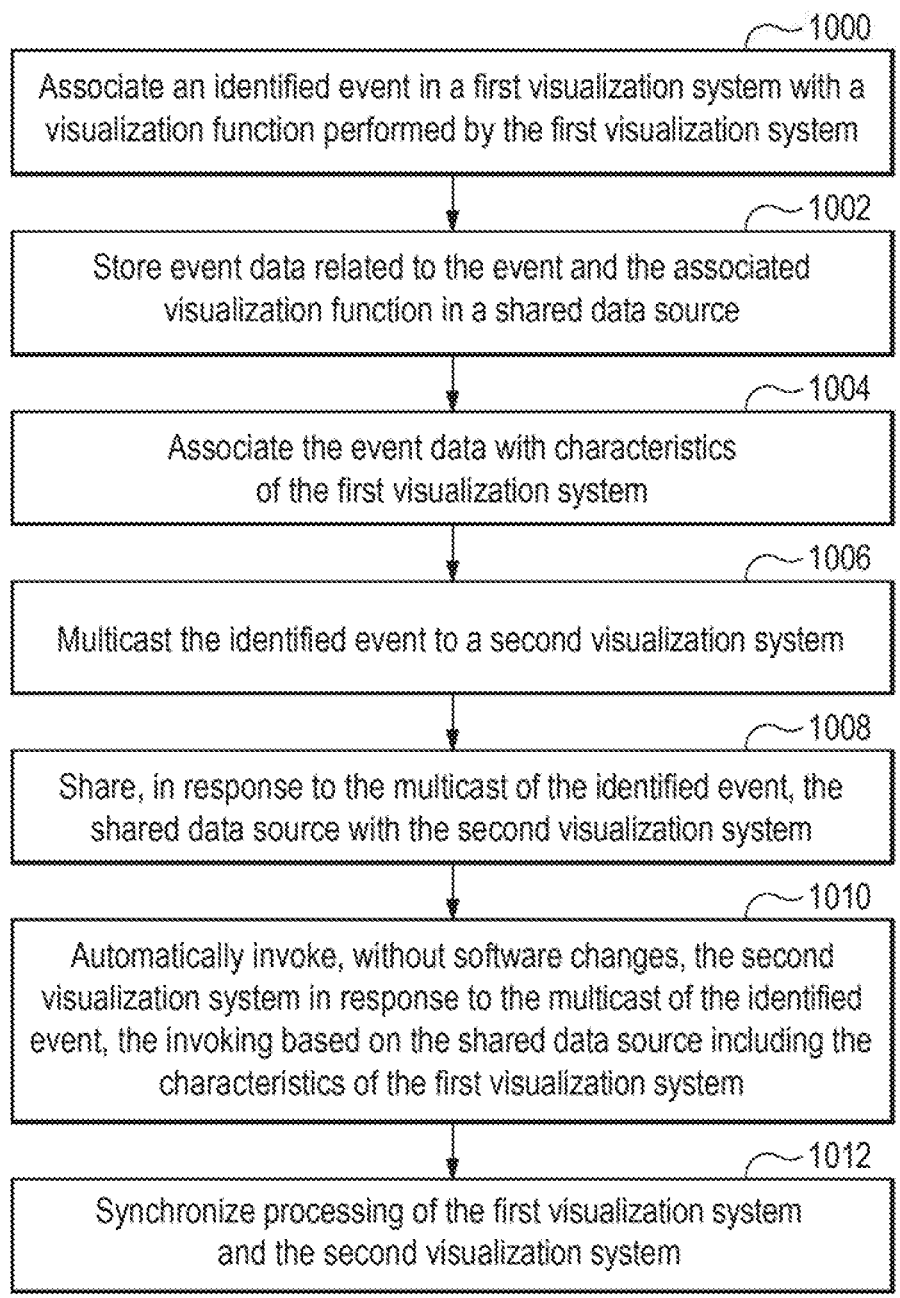
FIG. 10 is a flow diagram illustrating one example of a method for a unified visualization interface.

FIG. 10 is a flow diagram illustrating one example of a method for a unified visualization interface. At 1000, an identified event in a first visualization system may be associated with a visualization function performed by the first visualization system. At 1002, event data related to the identified event and the associated visualization function may be stored in a shared data source. At 1004, the event data may be associated with characteristics of the first visualization system. At 1006, the identified event may be multicast to a second visualization system. At 1008, the shared data source may be shared, in response to the multicast of the identified event, with the second visualization system. At 1010, the second visualization system may be automatically invoked, without software changes, the second visualization system in response to the multicast of the identified event, the invoking based on the shared data source including the characteristics of the first visualization system. At 1012, processing of the first visualization system and the second visualization system may be synchronized.

In some examples, a preceding visualization process of the second visualization system may be implemented in a programming language (e.g., Java), and automatically invoking the second visualization system may include inactivating the preceding visualization process (e.g., a Java Virtual Machine process), and by further performing one of requesting an operating system to launch a new process, generating a virtual mouse event, generating a virtual keyboard event, and via an application automation protocol built into the second visualization system.

In some examples, the identified event may be a selection of a portion of a visualization display, and the method may include determining a depth of the portion based on a geometry of the portion, and identifying data items for visual analytics based on the determined depth.

In some examples, the automatic invoking of the second visualization system may include configuring the second visualization system based on one of frame capture and automatic resizing.

In some examples, the automatic invoking of the second visualization system may be based on one of a navigation to a specified URL, an invocation of API requests, a generation of virtual mouse events, a generation of virtual keyboard events, and a manipulation of session variables. In some examples, the API requests may include REST API requests.

In some examples, the second visualization system may be based on a pixel-based helix visualization of a time series, and the method may include determining coordinates for limits as indicated by a starting point and a stopping point, and the automatic invoking of the second visualization system may include placing a virtual camera at a position and orientation, based on the coordinates and the event data, to make an indicated sequence of the time series visible by the virtual camera.

In some examples, associating the event data with the characteristics of the first visualization system may include associating an extensible markup language ("XML") configuration with the event data.

In some examples, the characteristics of the first visualization system may include one of a scale, a color map, input parameters, and data handling instructions.

Examples of the disclosure provide a generalized system for a unified visualization interface. The generalized system provides a novel methodology utilizing a combination of external event multicasting and data source sharing to allow communication between existing visualization systems. The generalized system eliminates a need for software changes for existing visual techniques to provide a single unified views over all applications.

Although specific examples have been illustrated and described herein, the examples illustrate applications to multiple visualization systems. Accordingly, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system comprising:
a processor;
an association module to associate an identified event in a first visualization display generated by a first visualization system with a visualization function performed by the first visualization system;
a multicasting module to:
store event data related to the identified event and the associated visualization function in a shared data source, and
multicast the identified event to a second visualization system;
a data sharing module to:
associate display characteristics of the first visualization system with the event data in the shared data source, and
share, in response to the multicast of the identified event, the shared data source, including the event data and the associated display characteristics of the first visualization system with the second visualization system, for the second visualization system to generate a second visualization display based on (i) the stored event data in the shared data source and (ii) the display characteristics of the first visualization system stored in the shared data source; and
a unified visualization interface to automatically invoke, without software changes, the second visualization system in response to the multicast of the identified event, the invoking based on the shared data source, including the stored event data and the stored display characteristics of the first visualization system,
wherein the second visualization system displays data elements based on a pixel-based helix visualization of a time series,
wherein the multicasting module determines coordinates for limits as indicated by a starting point and a stopping point, and
wherein the unified visualization interface automatically invokes the second visualization system by placing a virtual camera at a position and orientation, based on the coordinates and the stored event data, to make an indicated sequence of the time series visible by the virtual camera.

2. The system of claim 1, further including a synchronization module, managed via an interactive graphical user interface, to synchronize processing of the first visualization system and the second visualization system.

3. The system of claim 1, wherein associating the stored event data with the stored display characteristics of the first visualization system includes associating an extensible markup language ("XML") configuration with the event data.

4. The system of claim 1, wherein the stored display characteristics of the first visualization system include one of scale, color map, input parameters, and data handling instructions.

5. The system of claim 1, wherein the identified event comprises one of:
a selection of a portion of the first visualization display, and
a zoom operation on the first visualization display.

6. The system of claim 5, wherein the identified event is a selection of the portion of the first visualization display, and the visualization function includes determining a depth of the portion based on a geometry of the portion.

7. The system of claim 1, wherein the unified visualization interface automatically invokes the second visualization system by configuring the second visualization system based on one of frame capture and automatic resizing.

8. The system of claim 1, wherein the unified visualization interface automatically invokes the second visualization system based on one of a navigation to a specified URL, an invocation of application program interface requests, a generation of virtual mouse events, a generation of virtual keyboard events, and a manipulation of session variables.

9. The system of claim 1, wherein the unified visualization interface automatically invokes the second visualization system by inactivating a preceding visualization process, and by further performing one of requesting an operating system to launch a new process, generating a virtual mouse event, and generating a virtual keyboard event, via an application automation protocol built into the second visualization system.

10. A computer-implemented method to provide a synchronized and unified visualization interface via an electronic display, the method comprising:
associating an identified event in a first visualization display generated by a first visualization system with a visualization function performed by the first visualization system;

storing event data related to the identified event in a shared data source;

storing the associated visualization function in the shared data source;

associating display characteristics of the first visualization system with the stored event data in the shared data source, wherein the event data stored in the shared data source is unaltered by the storing of the associated visualization function and the associating of the display characteristics of the first visualization system with the stored event data in the shared data source;

multicasting, via a communication network, the identified event to a second visualization system to display the data elements based on a pixel-based helix visualization of a time series, wherein multicasting the identified event to the second visualization system includes determining coordinates for limits as indicated by a starting point and a stopping point;

sharing, in response to the multicast of the identified event, the shared data source, including the unaltered event data and the associated display characteristics of the first visualization system, with the second visualization system for the second visualization system to generate a second visualization;

invoking, without software changes, the second visualization system in response to the multicast of the identified event, the invoking based on the shared data source including the display characteristics of the first visualization system based on (i) the unaltered event data in the shared data source and (ii) the display characteristics of the first visualization system stored in the shared data source, wherein invoking the second visualization system comprises placing a virtual camera at a position and orientation, based on the coordinates and the stored event data, to make an indicated sequence of the time series visible by the virtual camera;

synchronizing processing of the first visualization system and the second visualization system; and automatically displaying, via an electronic display, the first visualization display of the first visualization system simultaneous with the second visualization display of the second visualization system.

11. The method of claim 10, wherein the stored display characteristics of the first visualization system include one of a scale, a color map, input parameters, and data handling instructions.

12. The method of claim 10, wherein the automatic invoking of the second visualization system includes configuring the second visualization system based on one of frame capture and automatic resizing.

13. A non-transitory computer readable medium comprising executable instructions stored thereon that, when implemented by a processor of a computing system, cause the computing system to:

associate an identified event in a first visualization display generated by a first visualization system with a visualization function performed by the first visualization system;

store event data related to the identified event and the associated visualization function in a shared data source;

multicast the identified event to a second visualization system using coordinates for limits as indicated by a starting point and a stopping point, wherein the second visualization system displays data elements based on a pixel-based helix visualization of a time series;

associate display characteristics of the first visualization system with the stored event data and store the associated display characteristics within the shared data source, the characteristics including one of scale, color map, input parameters, and data handling instructions;

share, in response to the multicast of the identified event, the shared data source, including the stored event data and the associated display characteristics of the first visualization system, with the second visualization system for the second visualization system to generate a second visualization display based on (i) the stored event data in the shared data source and (ii) the display characteristics of the first visualization system stored in the shared data source;

automatically invoke, without software changes, the second visualization system in response to the multicast of the identified event, the invoking based on the shared data source, including the stored event data and the stored display characteristics of the first visualization system, wherein the second visualization system is invoked by placing a virtual camera at a position and orientation, based on the coordinates and the stored event data, to make an indicated sequence of the time series visible by the virtual camera;

synchronize processing of the first visualization system and the second visualization system; and display simultaneously, on an electronic display, the first visualization display and the second visualization display.

14. The computer readable medium of claim 13, wherein the instructions to invoke the second visualization system include instructions to automatically invoke the second visualization system based on one of a navigation to a specified URL, an invocation of application program interface requests, a generation of virtual mouse events, a generation of virtual keyboard events, and a manipulation of session variables.

* * * * *